US009932901B2

(12) United States Patent
Sener

(10) Patent No.: US 9,932,901 B2
(45) Date of Patent: Apr. 3, 2018

(54) SHROUD RETENTION SYSTEM WITH RETENTION SPRINGS

(71) Applicant: General Electric Company, Schenectady, NY (US)

(72) Inventor: Alexander Martin Sener, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 249 days.

(21) Appl. No.: 14/708,995

(22) Filed: May 11, 2015

(65) Prior Publication Data

US 2016/0333785 A1 Nov. 17, 2016

(51) Int. Cl.
*F02C 7/20* (2006.01)
*F01D 11/08* (2006.01)
(Continued)

(52) U.S. Cl.
CPC ............... *F02C 7/20* (2013.01); *F01D 11/08* (2013.01); *F02C 3/04* (2013.01); *F01D 11/005* (2013.01);
(Continued)

(58) Field of Classification Search
CPC ...... F01D 11/08; F01D 11/005; F01D 11/025; F01D 11/14; F05D 2240/11; F05D 2260/30; F02C 7/20
See application file for complete search history.

(56) References Cited

U.S. PATENT DOCUMENTS 3,966,356 A * 6/1976 Irwin .................. F01D 11/08
277/545
5,201,846 A 4/1993 Sweeney
(Continued)

FOREIGN PATENT DOCUMENTS

CN 1092750 C 10/2002
CN 100359137 C 1/2008
(Continued)

OTHER PUBLICATIONS

European Search Report and Opinion issued in connection with related EP Application No. 16168855.1 dated Sep. 19, 2016.
(Continued)

*Primary Examiner* — Pascal M Bui Pho
*Assistant Examiner* — Katheryn Malatek
(74) *Attorney, Agent, or Firm* — General Electric Company; William Scott Andes

(57) ABSTRACT

A shroud retention system may generally include a shroud hanger and first and second hooked components extending from an outer hanger wall of the hanger. The first hooked component may include a first wall extending from the outer hanger wall and a first rail extending from the first wall. The second hooked component may include a second wall extending from the outer hanger wall and a second rail extending from the second wall. In addition, the system may also include a shroud segment having a shroud wall configured to be positioned radially between the outer hanger wall and the first and second rails. Moreover, the system may include a retention spring positioned within a radial space defined between the outer hanger wall and the first and second rails that is configured to apply a radial spring force against the shroud segment.

20 Claims, 17 Drawing Sheets

(51) Int. Cl.
*F02C 3/04* (2006.01)
*F01D 11/00* (2006.01)
*F01D 11/02* (2006.01)
*F01D 11/14* (2006.01)

(52) U.S. Cl.
CPC ............ *F01D 11/025* (2013.01); *F01D 11/14* (2013.01); *F05D 2240/11* (2013.01); *F05D 2260/30* (2013.01); *F05D 2260/38* (2013.01); *Y02T 50/672* (2013.01)

(56) References Cited

U.S. PATENT DOCUMENTS

| | | | |
|---|---|---|---|
| 5,553,999 | A | 9/1996 | Proctor et al. |
| 5,593,276 | A | 1/1997 | Proctor et al. |
| 5,775,874 | A | 7/1998 | Boite et al. |
| 5,927,942 | A | 7/1999 | Stahl et al. |
| 6,048,170 | A | 4/2000 | Dodd |
| 6,435,820 | B1 | 8/2002 | Overberg |
| 6,467,339 | B1 | 10/2002 | Descoteaux et al. |
| 6,575,697 | B1 | 6/2003 | Arilla et al. |
| 6,726,448 | B2 | 4/2004 | McGrath et al. |
| 6,758,653 | B2 | 7/2004 | Morrison |
| 6,962,482 | B2 | 11/2005 | Tanaka |
| 7,186,078 | B2 | 3/2007 | Tanaka |
| 7,396,206 | B2 | 7/2008 | Humhauser |
| 7,407,368 | B2 | 8/2008 | Tanaka |
| 7,438,520 | B2 | 10/2008 | Ruthemeyer et al. |
| 7,563,059 | B2 | 7/2009 | Song |
| 8,141,370 | B2 | 3/2012 | Bulman et al. |
| 9,089,925 | B2 | 7/2015 | Braeuer |
| 2004/0005216 | A1 | 7/2004 | Morrison |
| 2005/0196270 | A1 | 9/2005 | Amiot et al. |
| 2006/0067815 | A1 | 3/2006 | Ghasripoor et al. |
| 2011/0189009 | A1 | 8/2011 | Shapiro et al. |
| 2012/0282540 | A1 | 11/2012 | Suzumura et al. |
| 2013/0017057 | A1* | 1/2013 | Lagueux ................. F01D 11/22 415/1 |
| 2013/0136582 | A1* | 5/2013 | Mizokami ................. F01D 9/04 415/173.1 |
| 2016/0312639 | A1 | 10/2016 | Niu et al. |

FOREIGN PATENT DOCUMENTS

| | | |
|---|---|---|
| CN | 103161525 A | 6/2013 |
| DE | 102008007321 A1 | 8/2009 |
| EP | 1099826 A1 | 5/2001 |
| EP | 1577506 A1 | 9/2005 |
| GB | 2468768 A | 9/2010 |
| JP | 61152906 A | 7/1986 |
| JP | 2000-045707 A | 2/2000 |
| JP | 2003-293704 A | 10/2003 |
| JP | 2006-105393 A | 4/2006 |
| JP | 2007-046605 A | 2/2007 |
| JP | 2008-157251 A | 7/2008 |
| JP | 2011-521143 A | 7/2011 |
| JP | 2012-077743 A | 4/2012 |
| JP | 2012-140937 A | 7/2012 |
| JP | 2013-064404 A | 4/2013 |
| JP | 2013-514182 A | 4/2013 |
| JP | 2013-531159 A | 8/2013 |
| JP | 2013-170578 A | 9/2013 |

OTHER PUBLICATIONS

GE Related Case Form.
European Search Report & Opinion issued in connection with corresponding EP Application No. 16169012.8 dated Sep. 27, 2016.
First Office Action and Search issued in connection with corresponding CN Application No. 201610308328.9 dated Apr. 1, 2017.
Search Report issued in connection with corresponding JP Application No. 2016-090011 dated Apr. 26, 2017.
Search Report issued in connection with related JP Application No. 2016-093540 dated Apr. 26, 2017.
First Office Action and Search issued in connection with related CN Application No. 201610656934.X dated Apr. 26, 2017.
Notification of Reasons for Refusal issued in connection with related JP Application No. 2016-093540 dated May 9, 0217.
Notification of Reasons for Refusal issued in connection with corresponding JP Application No. 2016-090011 dated May 9, 2017.
Decision to Grant issued in connection with related JP Application No. 2016-093540 dated Jul. 4, 2017.
Notice of Allowance towards related U.S. Appl. No. 14/709,041 dated Aug. 7, 2017.

* cited by examiner

SHROUD RETENTION SYSTEM WITH RETENTION SPRINGS

FIELD OF THE INVENTION

The present subject matter relates generally to turbine shrouds and, more particularly, to a system for coupling a shroud segment of a turbine shroud to a shroud hanger that includes one or more retention springs for radially retaining/positioning the shroud segment relative to the shroud hanger.

BACKGROUND OF THE INVENTION

A typical gas turbine engine includes one or more turbine rotors configured to extract energy from a flow of combustion gases directed through the engine. Each rotor includes an annular array of blades coupled to a rotor disk. The radially outermost boundary of the flowpath through the rotor is defined primarily by a turbine shroud, which is a stationary structure that circumscribes the tips of the blades. As is generally understood, the various rotor components operate in an extremely high temperature environment and it is often required that the components be cooled by an air flow to ensure adequate service life. Typically, the air used for cooling is extracted (or bled) from the compressor, which negatively impacts the specific fuel consumption ("SFC") of the gas turbine engine.

In the past, it has been proposed to replace metallic shroud structures with materials having improved high-temperature capabilities, such as ceramic matrix composite (CMC) materials. These materials have unique mechanical properties that must be considered during the design and application of a turbine component, such as a shroud segment. For example, when compared to metallic materials, CMC materials have relatively low tensile ductility or low strain to failure, and a low coefficient of thermal expansion ("CTE"). One type of segmented CMC shroud incorporates a rectangular "box" design.

Conventionally, shroud segments have been coupled to an outer turbine structure, such as a shroud hanger, using a very tight friction-based fit. For example, it is known to radially retain shroud segments via a standard C-clip that utilizes an interference fit to couple the shroud segment to its corresponding shroud hanger. Unfortunately, interference-type fits are typically not appropriate for CMC-based and other non-metallic-based shroud segments (particularly box-type shroud segments) given that the shroud segments are extremely susceptible to edge damage and other types of damage when the component(s) providing the interference fit is installed onto and/or around the shroud segment.

Accordingly, an improved shroud retention system for radially retaining a shroud segment relative to a shroud hanger that does not rely on an interference fits) would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a shroud retention system. The system may generally include a shroud hanger having an outer hanger wall extending between a first end and a second end. The system may also include first and second hooked components configured to extend from the outer hanger wall at the first and second ends, respectively. The first hooked component may include a first wall extending radially inwardly from the outer hanger wall and a first rail extending from the first wall in the direction of the second end of the outer hanger wall. The second hooked component may include a second wall extending radially inwardly from the outer hanger wall and a second rail extending from the second wall in the direction of the first end of the outer hanger wall. In addition, the system may also include a shroud segment having a shroud wall extending between a first segment end and a second segment end. The first segment end may be configured to be positioned radially between the outer hanger wall and the first rail. The second segment end may be configured to be positioned radially between the outer hanger wall and the second rail. Moreover, the system may include a retention spring positioned within a radial space defined between the outer hanger wall and the first and second rails that is configured to apply a radial spring force against the shroud segment.

In another aspect, the present subject matter is directed to a shroud retention system. The system may generally include a shroud hanger having an outer hanger wall extending between a first end and a second end. The shroud hanger may further include a first retention hook extending from the outer hanger wall at the first end and a second retention hook extending from the outer hanger wall at the second end. The first retention hook may include a first hook wall extending radially inwardly from the outer hanger wall and a first hook rail extending from the first hook wall in the direction of the second retention hook. The second retention hook may include a second hook wall extending radially inwardly from the outer hanger wall and a second hook rail extending from the second hook wall in the direction of the first retention hook. The system may also include a shroud segment having a shroud wall extending between a first segment end and a second segment end. The first segment end may be configured to be positioned radially between the outer hanger wall and the first hook rail. The second segment end may be configured to be positioned radially between the outer hanger wall and the second hook rail. In addition, the system may include a retention spring positioned within a radial space defined between the outer hanger wall and the first and second hook rails that is configured to apply a radial spring force against the shroud segment.

In a further aspect, the present subject matter is directed to a gas turbine engine including a compressor, a combustor in fluid communication with the compressor, a turbine downstream of the combustor and a shroud retention system disposed within the turbine. The shroud retention system may generally include a shroud hanger having an outer hanger wall extending between a first end and a second end. The system may also include first and second hooked components configured to extend from the outer hanger wall at the first and second ends, respectively. The first hooked component may include a first wall extending radially inwardly from the outer hanger wall and a first rail extending from the first wall in the direction of the second end of the outer hanger wall. The second hooked component may include a second wall extending radially inwardly from the outer hanger wall and a second rail extending from the second wall in the direction of the first end of the outer hanger wall. In addition, the system may also include a shroud segment having a shroud wall extending between a first segment end and a second segment end. The first segment end may be configured to be positioned radially between the outer hanger wall and the first rail. The second segment end may be configured to be positioned radially between the outer hanger wall and the second rail. Moreover, the system may include a retention spring positioned within a radial space defined between the outer hanger wall and the first and second rails that is configured to apply a radial spring force against the shroud segment.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
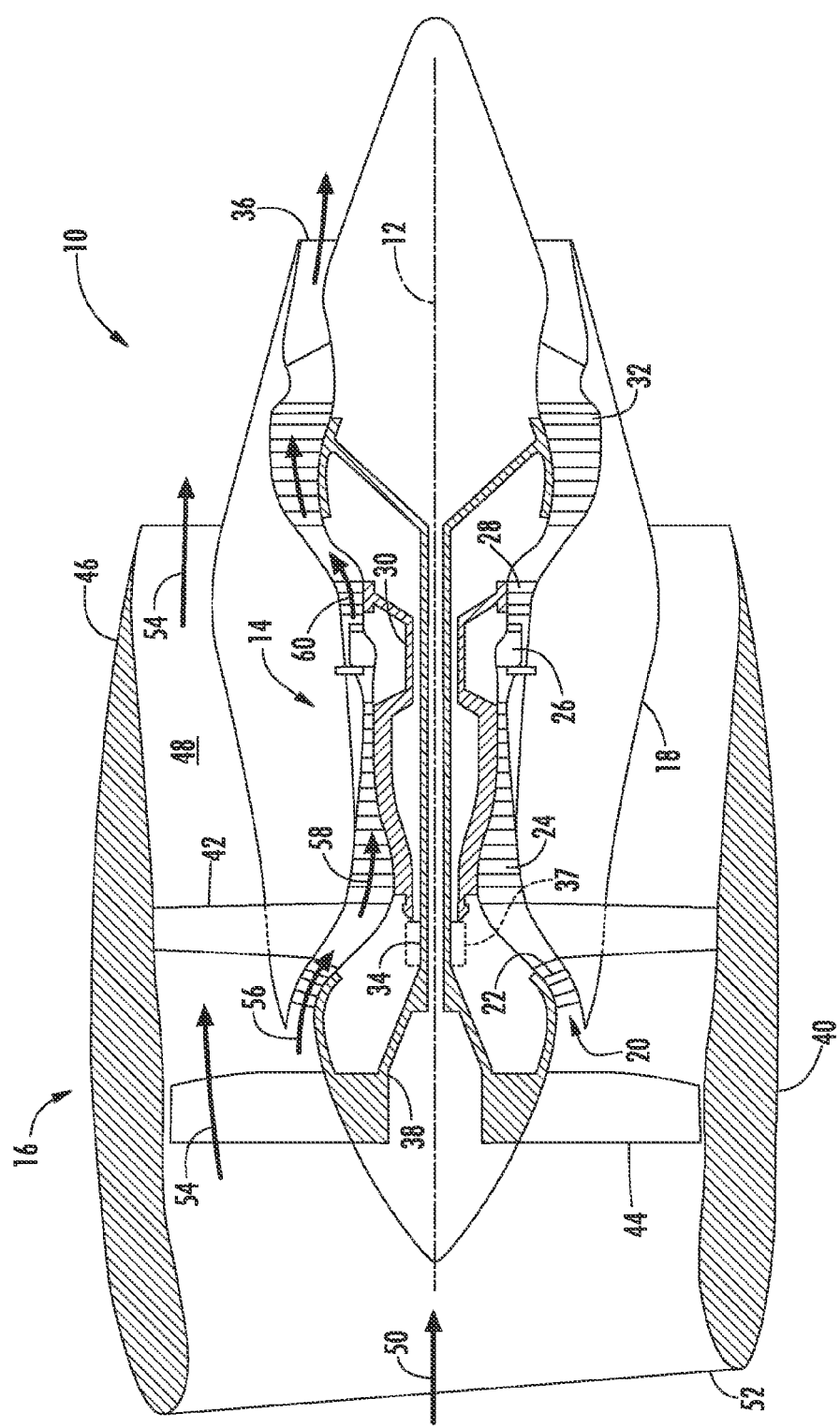
FIG. 1 illustrates a cross-sectional view of one embodiment of a gas turbine engine that may be utilized within an aircraft in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a retention system for coupling a shroud segment of a turbine shroud to a corresponding shroud hanger of a gas turbine engine. As indicated above, shroud segments for use within a gas turbine engine are often formed from a non-metallic composite material, such as a ceramic matrix composite (CMC) material. As a result, unique challenges are presented for radially supporting or retaining the shroud segments within the turbine. For example, current shroud retention features rely on an interference fit to couple a shroud segment to its corresponding shroud hanger. However, as indicated above, interference fits are typically not suitable for non-metallic-based shrouds, particularly CMC-based rectangular box shrouds. As a result, embodiments of the present subject matter are directed to retention features that allow a shroud segment to be coupled to a shroud hanger without requiring an interference fit between the shroud segment and the shroud hanger or between the shroud segment and another system component.

Specifically, in several embodiments, the retention system may include first and second retention clips configured to couple a given shroud segment to its corresponding shroud hanger. In such embodiments, the retention clips and the shroud hanger may be configured to define mating or keyed retention features for coupling the retention clips to the hanger. For example, as will be described below, the shroud hanger may define clip grooves at its circumferential ends, with each clip groove defining an enlarged portion configured to receive a corresponding enlarged portion of each retention clip. Such a configuration may provide a keyhole-type fit between the shroud hanger and the retention clips, which may allow for the shroud segment to be positively located relative to the hanger without requiring an interference fit between such components.

Additionally, in other embodiments, the retention system may include one or more retention springs configured to apply a radial spring force against the shroud segment so as to radially retain the shroud segment relative to its corresponding shroud hanger. In such embodiments, the retention system may also include hooked components configured to be formed integrally with or separately coupled to the shroud hanger for radially supporting the shroud segment. The retention spring(s) may then be located directly between portions of the hooked components and the shroud segment or directly between the portions of the shroud segment and the shroud hanger to allow the spring(s) to apply a radial spring force against the shroud segment that allows the shroud segment to be radially retained relative to the shroud hanger.

It should be appreciated that the retention features disclosed herein need not be utilized in isolation. For example, as will be described below, the retention clips may be used in combination with the retention springs to provide a further means for radially retaining a shroud segment relative to its corresponding shroud hanger without requiring the use of an interference fit.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

It should be appreciated that each turbine 28, 32 may generally include one or more turbine stages, with each stage including a turbine nozzle (not shown in FIG. 1) and a downstream turbine rotor (not shown in FIG. 1). As will be described below, the turbine nozzle may include a plurality of vanes disposed in an annular array about the centerline axis 12 of the engine 10 for turning or otherwise directing the flow of combustion products through the turbine stage towards a corresponding annular array of rotor blades forming part of the turbine rotor. As is generally understood, the rotor blades may be coupled to a rotor disk of the turbine rotor, which is, in turn, rotationally coupled to the turbine's drive shaft (e.g., drive shaft 30 or 34).

Additionally, as shown in FIG. 1, the fan section 16 of the engine 10 may generally include a rotatable, axial-flow fan rotor 38 that configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor 38 to provide a direct-drive configuration. Alternatively, the second drive shaft 34 may be coupled to the fan rotor 38 via a speed reduction device 37 (e.g., a reduction gear or gearbox) to provide an indirect-drive or geared drive configuration. Such a speed reduction device(s) may also be provided between any other suitable shafts and/or spools within the engine as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Figure 2:
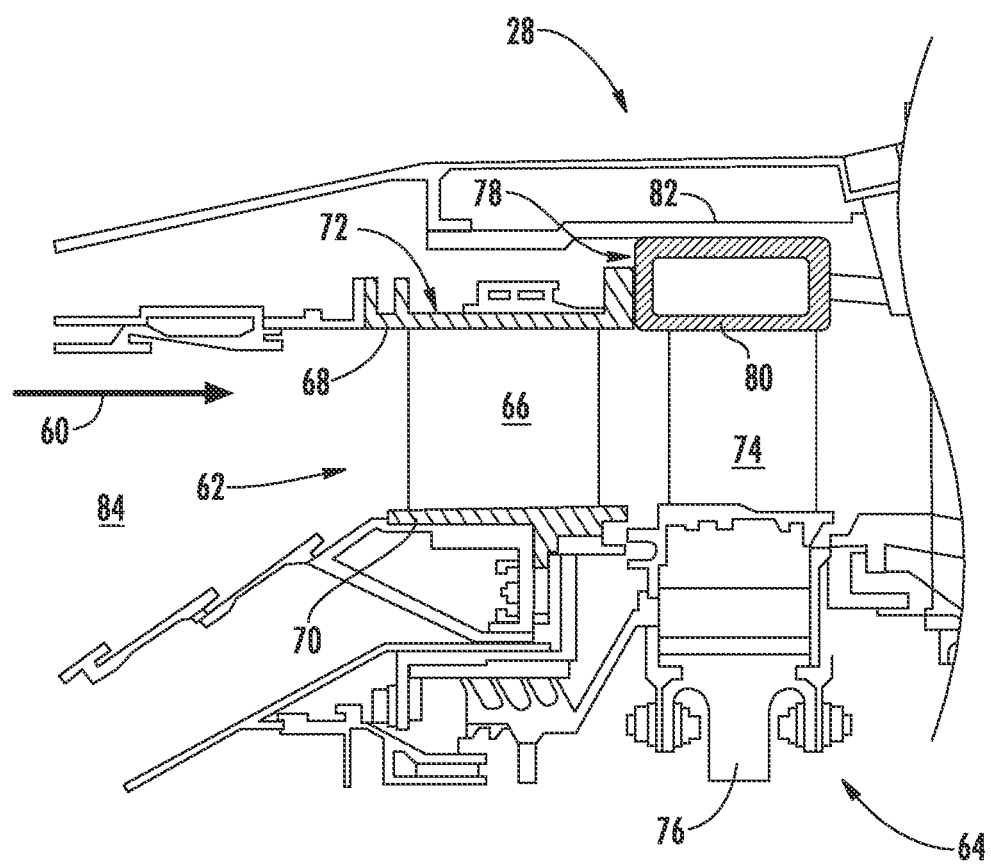
FIG. 2 illustrates a cross-sectional view of one embodiment of a turbine configuration suitable for use within the gas turbine engine shown in FIG. 1.

Referring now to FIG. 2, a partial, cross-sectional view of the first (or high pressure) turbine 28 described above with reference to FIG. 1 is illustrated in accordance with embodiments of the present subject matter. As shown, the first turbine 28 may include a first stage turbine nozzle 62 and a first stage turbine rotor 64. The nozzle 62 may generally be defined by an annular flow channel that includes a plurality of radially-extending, circularly-spaced nozzle vanes 66 (one of which is shown). The vanes 66 may be supported between a number of arcuate outer bands 68 and arcuate inner bands 70. As is generally understood, the vanes 66, outer bands 68 and inner bands 70 may be arranged into a plurality of circumferentially adjoining nozzle segments 72 to form a complete 360 degree assembly, with the outer and inner bands 68, 70 of each nozzle segment 72 generally defining the outer and inner radial flow path boundaries, respectively, for the combustion products (indicated by arrow 60) flowing through the nozzle 72 along the hot gas path of the engine 10.

Additionally, the first stage turbine rotor 64 may include a plurality of circumferentially spaced rotor blades 74 (only one of which is shown in FIG. 2) extending radially outwardly from a rotor disk 76 that rotates about the centerline axis 12 (FIG. 1) of the engine 10. Additionally, a turbine shroud 78 may be positioned immediately adjacent to the radially outer tips of the rotor blades 74 so as to define the outer radial flowpath boundary for the combustion products 60 flowing through the turbine rotor 64 along the hot gas path of the engine 10. The turbine shroud 78 may generally be formed by a plurality of arcuate shroud segments 80 (one of which is shown in FIG. 2), with the shroud segments 80 being arranged circumferentially in an annular array about the centerline axis 12 so as to form a complete 360 degree assembly. As shown in FIG. 2, in several embodiments, each shroud segment 80 may be configured as a "box" shroud segment and, thus, may define a generally rectangular cross-sectional profile. As is generally understood, the shroud segments 80 may, in certain instances, be radially retained relative to the rotor blades 74 via a shroud hanger 82 or other suitable stationary structure that allows for coupling the shroud segments 80 to a casing of the gas turbine engine 10.

During operation, hot gases of combustion 60 may flow in an axial direction from a combustion zone 84 of the combustor 26 (FIG. 1) into the annular, first stage turbine nozzle 62. The nozzle vanes 66 of the first stage turbine nozzle 62 may generally be configured to turn or direct the hot gases so that the flow angularly impinges upon the rotor blades 74 of the first stage rotor 64. The flow of hot gases around the annular array of rotor blades 74 may result in rotation of the turbine rotor 64, which may then rotationally drive the shaft (e.g., the first drive shaft 30 shown in FIG. 1) to which the rotor 64 is coupled.

It should be appreciated that, although only the first stage of the high pressure turbine 28 was generally described above, the turbine 28 may also include any number of follow-up stages including any number of corresponding, sequential annular arrays of nozzle vanes and turbine blades. Similarly, the low pressure turbine 32 (FIG. 1) may also include a similar configuration, with one or more stages of sequential annular arrays of nozzle vanes and turbine blades.

Figure 3:
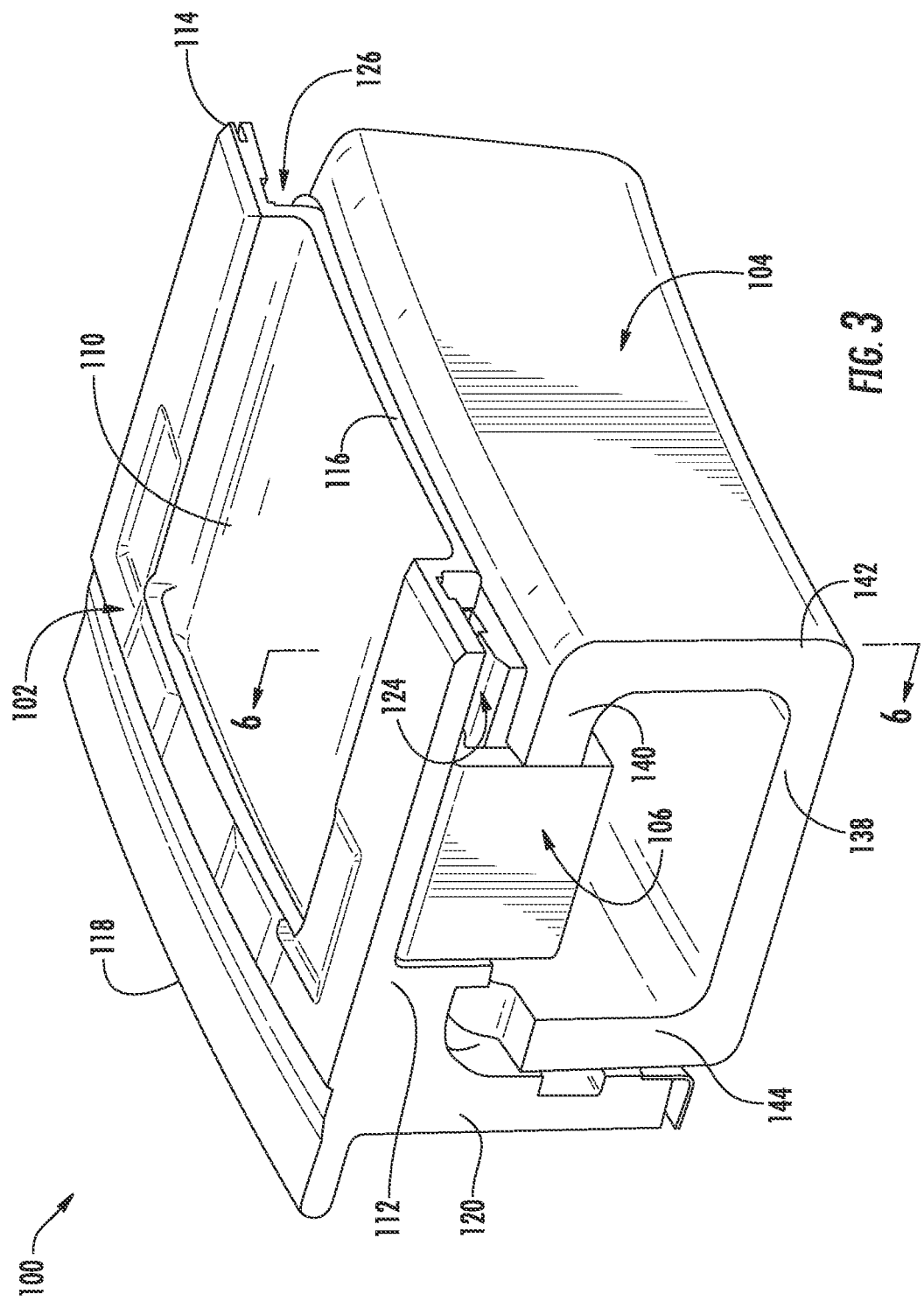
FIG. 3 illustrates a perspective view of one embodiment of a shroud retention system in accordance with aspects of the present subject matter, particularly illustrating a shroud hanger, a shroud segment and retention clips of the system being assembled together.
Figure 4:
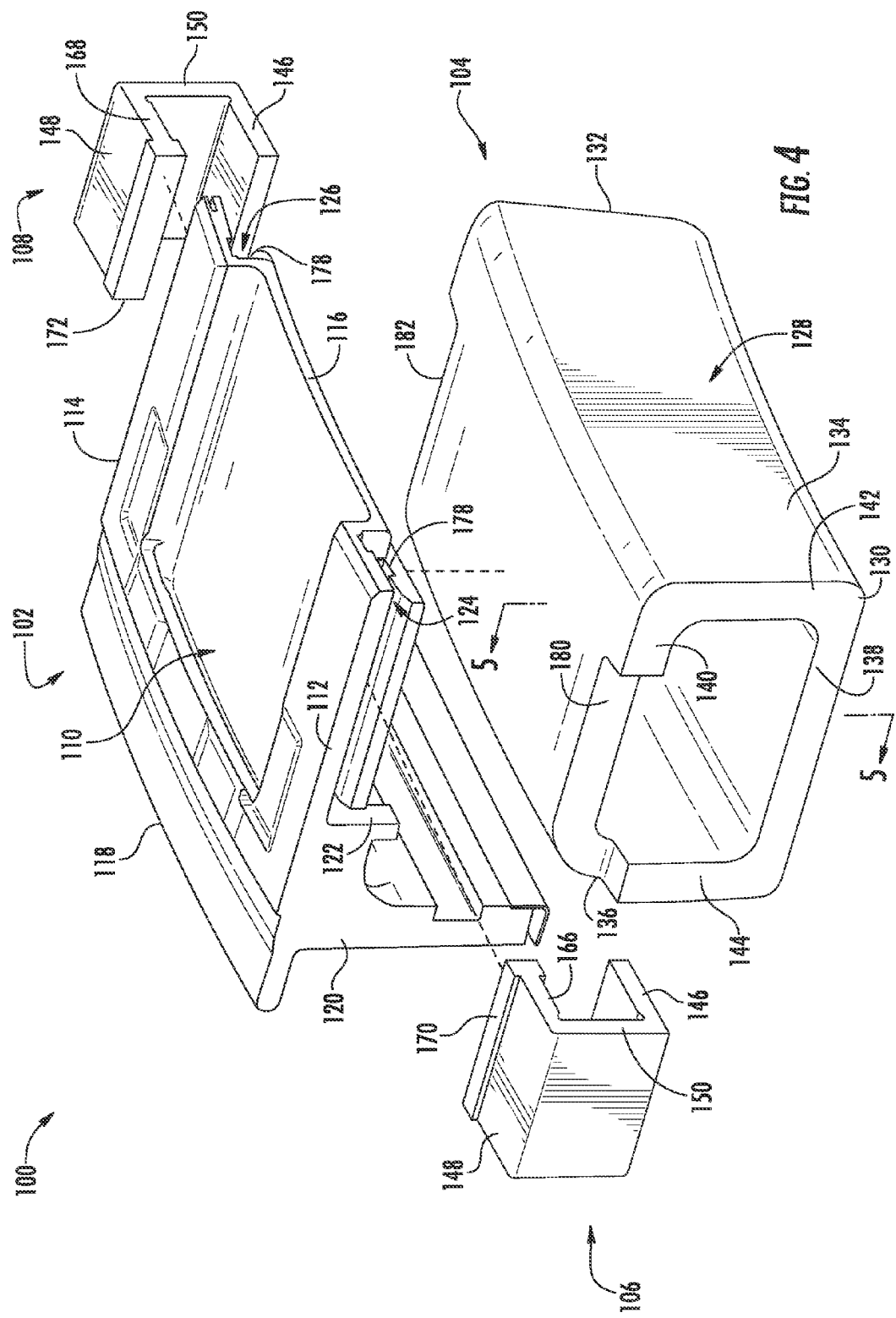
FIG. 4 illustrates another perspective view of the shroud retention system shown in FIG. 3, particularly illustrating the shroud hanger, the shroud segment and the retention clips exploded away from one another.
Figure 5:
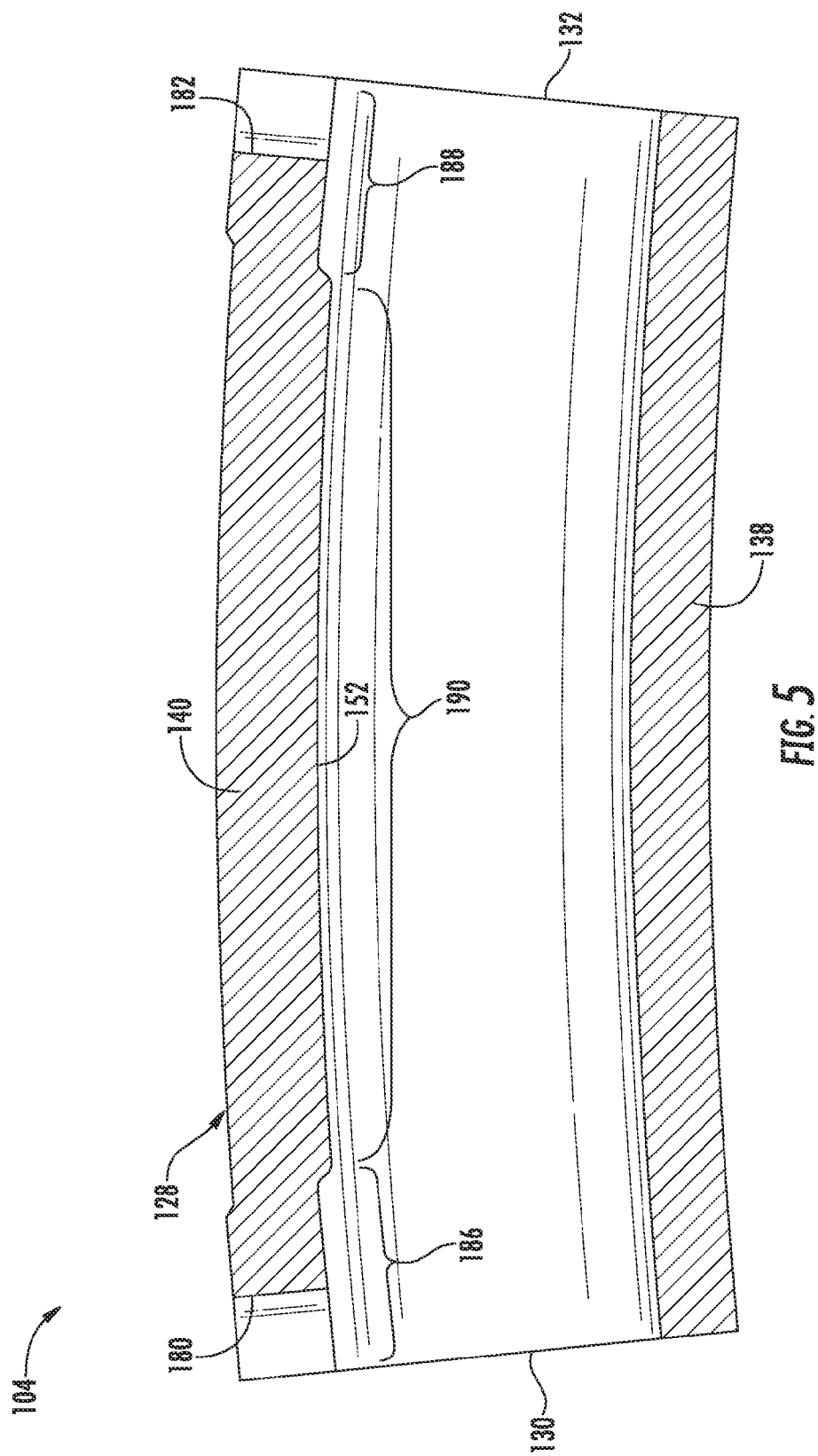
FIG. 5 illustrates a cross-sectional view of the shroud segment shown FIG. 4 taken about line 5-5.
Figure 6:
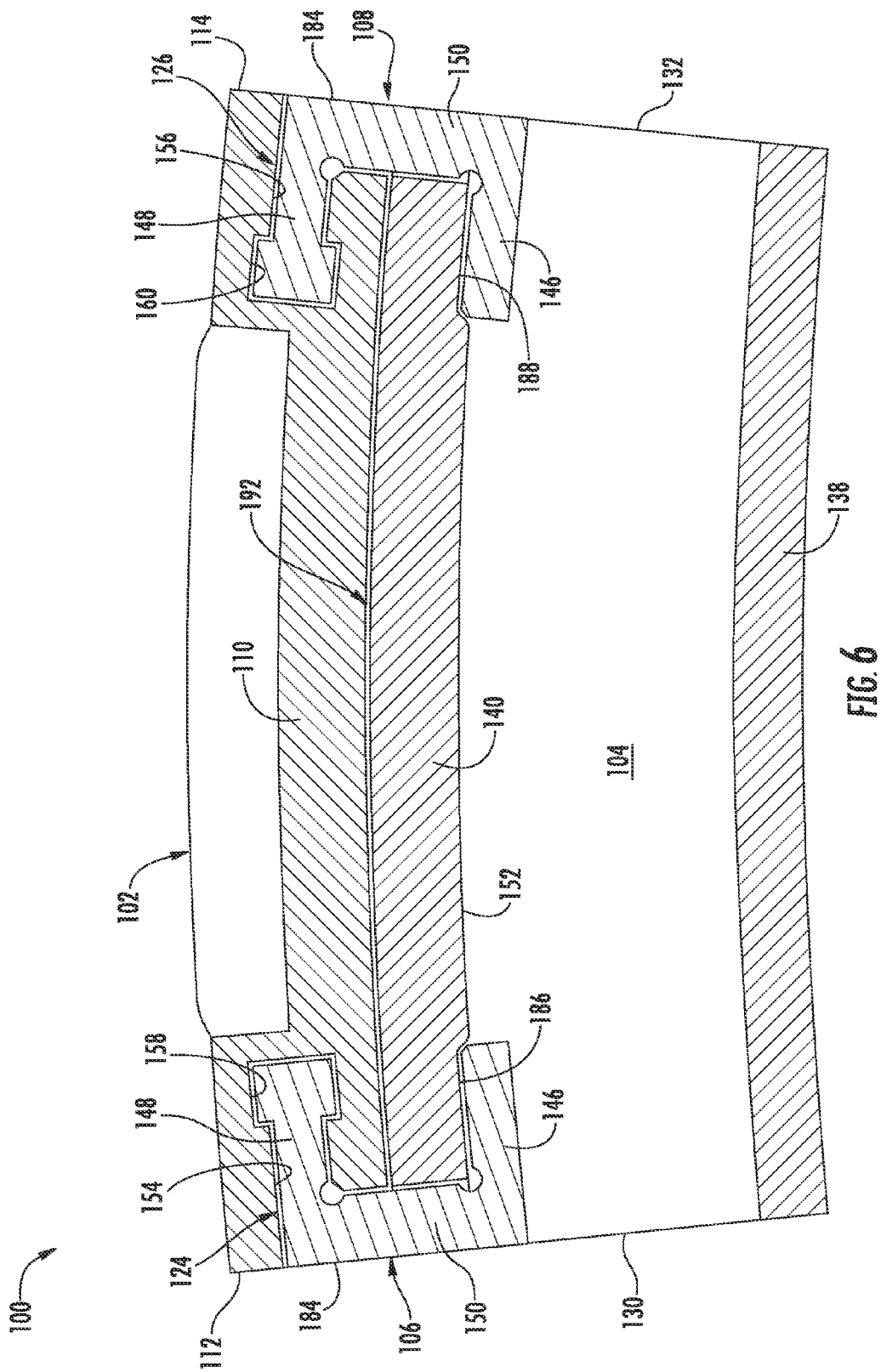
FIG. 6 illustrates a cross-sectional view of the assembled system components shown in FIG. 3 taken about line 6-6.
Figure 7:
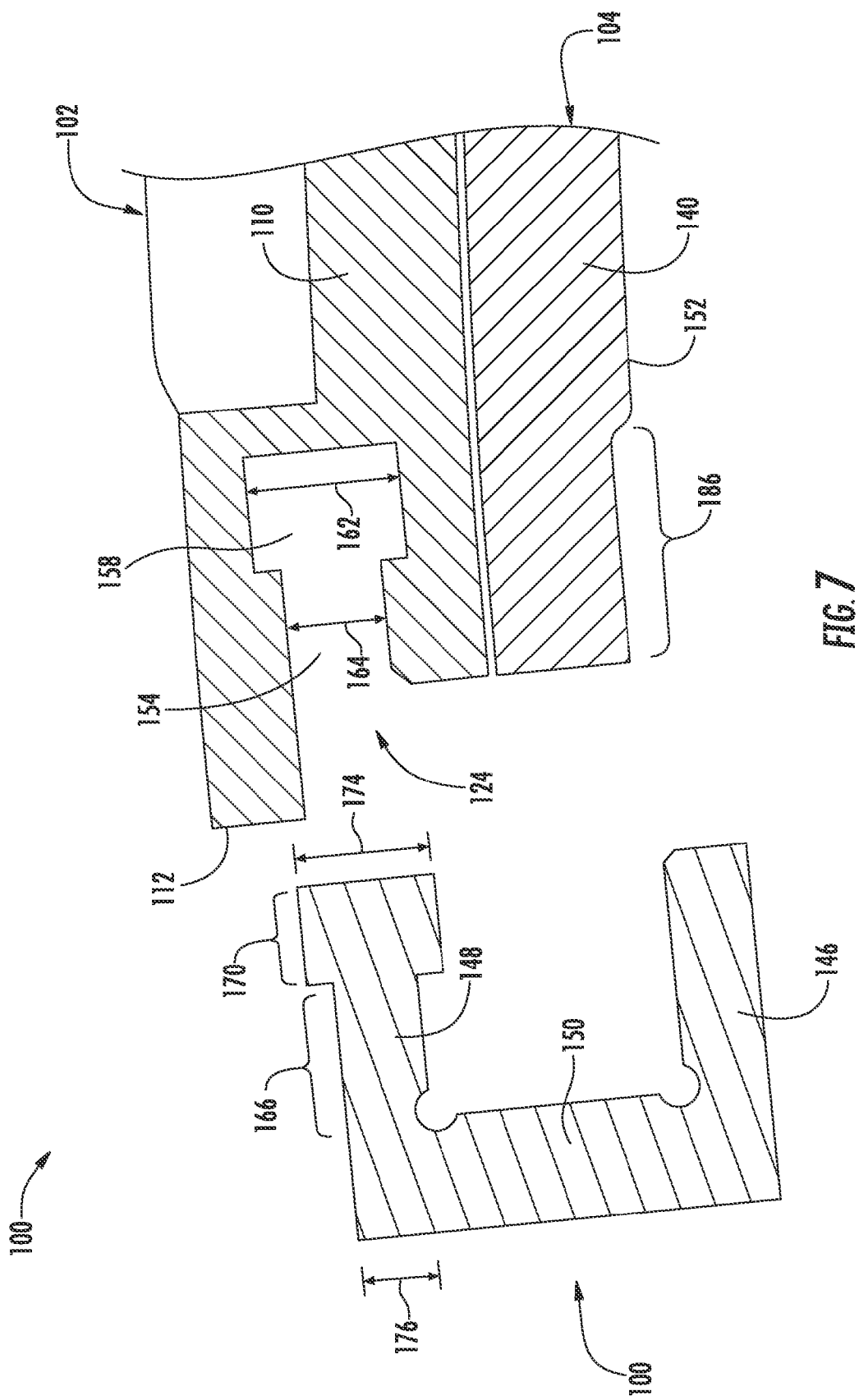
FIG. 7 illustrates a close-up, cross-sectional view of a portion of the shroud hanger and the shroud segment shown in FIG. 6 with the retention clips extending between such portions of the shroud hanger and the shroud segment being exploded away for purposes of illustration.

Referring now to FIGS. 3-7, several views of one embodiment of a shroud retention system 100 are illustrated in accordance with aspects of the present subject matter. Specifically, FIG. 3 illustrates a perspective view of various components of the retention system 100 assembled together and FIG. 4 illustrates a perspective view of the various system components exploded away from one another. FIG. 5 illustrates a cross-sectional view of a shroud segment 104 of the disclosed system 100 shown in FIG. 4 taken about line 5-5. Additionally, FIG. 6 illustrates a cross-sectional view of the assembled system components shown in FIG. 3 taken about line 6-6 and FIG. 7 illustrates a close-up, cross-sectional view of a portion of the assembled components shown in FIG. 6 with a retention clip 106 of the disclosed system 100 exploded away from the assembled components for purposes of illustration.

As shown in the illustrated embodiment, the disclosed retention system 100 may generally include a shroud hanger 102 and a shroud segment 104 configured to be coupled to the shroud hanger 102 via first and second retention clips 106, 108. In general, the retention clips 106, 108 may be configured to allow the shroud segment 104 to be radially retained relative to the shroud hanger 102 such that the shroud segment 104 is properly positioned at a location immediately radially outwardly from the rotor blades of the corresponding turbine rotor (e.g., at a location radially outwardly from the rotor blade 74 shown in FIG. 2). As such, the shroud segment 104 may be radially retained at a suitable location for defining a portion of the outer radial flowpath of the combustion products flowing through the turbine.

As particularly shown in FIGS. 3 and 4, the shroud hanger 102 may generally include an upper or outer hanger wall 110 configured to extend circumferentially between a first end 112 and a second end 114 and axially between a forward end 118 and an aft end 116. In addition, the shroud hanger 102 may also include a forward wall 120 extending radially inwardly from the outer hanger wall 110 at a location at or adjacent to its forward end 118. As particularly shown in FIG. 4, a portion of the outer hanger wall 110 and/or a portion of the forward wall 120 may generally define shroud location features 122 (only one of which is shown) that are configured to assist in circumferentially locating the shroud segment 104 relative to the shroud hanger 102.

Moreover, the shroud hanger 102 may also include separate clip grooves 124, 126 defined at the opposed circumferential ends 112, 114 of the outer hanger wall 110. For example, as shown in FIG. 6, a first clip groove 124 may be defined at the first end 112 of the outer hanger wall 110 that extends circumferentially from the first end 112 in the direction of the second end 114 of the outer hanger wall 110. Similarly, a second clip groove 126 may be defined at the second end 114 of the outer hanger wall 110 extends circumferentially from the second end 114 in the direction of the first end 112 of the outer hanger wall 110. As will be described below, the clip grooves 124, 126 may be configured to receive keyed portions of the retention clips 106, 108 in order to allow the shroud segment 104 to be coupled the shroud hanger 102.

Referring particularly to FIG. 4, the shroud segment 104 of the disclosed system 100 may generally include a shroud body 128 configured to extend circumferentially along an arcuate path between first and second circumferential ends 130, 132 and axially between a forward shroud end 136 and an aft shroud end 134. As shown in the illustrated embodiment, the shroud segment 104 may, in several embodiments, correspond to a box-type shroud segment. Thus, the shroud body 128 may be configured to define a generally rectangular cross-sectional shape. For example, as shown in FIGS. 3 and 4, the shroud body 128 may include a radially inner shroud wall 138, a radially outer shroud wall 140, and forward and aft walls 144, 142 extending radially between the inner and outer shroud walls 138, 140 so as to define the rectangular, box-like cross-sectional shape.

As indicated above, to allow the shroud segment 104 to be coupled to the shroud hanger 102, the disclosed retention system 100 includes first and second retention clips 106, 108 configured to serve as a connecting or coupling means between the shroud segment 104 and the shroud hanger 102. In several embodiments, the retention clips 106, 108 may correspond to modified "C-clips" and, thus, may generally include a wall(s) and/or rail(s) configured to generally define a "C-shaped" profile. For example, as particularly shown in FIGS. 4 and 7, each retention clip 106, 108 may include an inner rail 146, an outer rail 148 and a clip wall 150 extending radially between the inner and outer rails 146, 148. As will be described below, the outer rails 148 of the retention clips 106, 108 may generally be configured to be received within the clip grooves 124, 126 defined by the shroud hanger 102 while the inner rails 146 of the retention clips 106, 108 may be configured to radially engage an inner surface 152 of the outer shroud wall 140 of the shroud segment 104. As such, when the retention clips 106, 108 are properly installed relative to the shroud segment 104 and the shroud hanger 102, the shroud segment 104 may be coupled to the hanger 102 in a manner that retains the shroud segment 104 at a desired radial location during operation of the gas turbine engine.

In several embodiments, the clip grooves 124, 126 defined in the shroud hanger 102 and the outer rails 148 of the retention clips 106, 108 may include corresponding keyed or mating retention features to allow the clips 106, 108 to be positively located relative to the shroud hanger 102 without requiring an interference fit between the outer rails 148 and the hanger 102. Specifically, in one embodiment, each clip groove 124, 126 may include a narrow groove portion 154, 156 extending into the shroud hanger 102 from each end 112, 114 of the outer hanger wall 110 and an enlarged groove portion 158, 160 extending circumferentially from the corresponding narrow groove portion 154, 156. For example, as shown in FIGS. 6 and 7, the first clip groove 124 may include a first narrow groove portion 154 extending into the shroud hanger 102 from the first circumferential end 112 of the outer hanger wall 110 and a first enlarged groove portion 158 extending circumferentially from the first narrow groove portion 154 in the direction of the second circumferential end 114 of the outer hanger wall 110. Similarly, the second clip groove 126 may include a second narrow groove portion 156 extending into the shroud hanger 102 from the second circumferential end 114 of the outer hanger wall 110 and a second enlarged groove portion 160 extending circumferentially from the second narrow groove portion 156 in the direction of the first circumferential end 112 of the outer hanger wall 110. As particularly shown in FIG. 7, each enlarged groove portion 158, 160 may be configured to define a radial height 162 that is greater than a corresponding radial height 164 of each narrow groove portion 154, 156. For example, in the illustrated embodiment, each enlarged groove portion 158, 160 extends both radially outwardly and radially inwardly from its corresponding narrow groove portion 154, 156 at the interface defined between such groove portions so as to define the increased radial height 162. However, in other embodiments, each enlarged groove portion 158, 160 may only be configured to extend radially outwardly or radially inwardly from its corresponding narrow groove portion 154, 156 so as to define the increased radial height 162.

Additionally, as shown in the illustrated embodiment, the outer rails 148 of the retention clips 106, 108 may be configured to define a keyed profile generally corresponding to or matching the specific profile defined by each clip groove 124, 126. For example, as particularly shown in FIGS. 4 and 7, the outer rail 148 of the first retention clip 106 includes a first narrow rail portion 166 extending outwardly from its clip wall 150 and a first enlarged rail portion 170 extending outwardly from the first narrow rail portion 166. As such, when the first retention clip 106 is being coupled to the shroud hanger 102, the first narrow rail portion 166 may be configured to be received within the first narrow groove portion 154 of the first clip groove 124 and the first enlarged rail portion 170 may be configured to be received within the first enlarged groove portion 158 of the first clip groove 124. Similarly, as shown in FIG. 4, the outer rail 148 of the second retention clip 108 includes a second narrow rail portion 168 extending outwardly from its clip wall 150 and a second enlarged rail portion 172 extending outwardly from the second narrow rail portion 168. As such, when the second retention clip 108 is being coupled to the shroud hanger 102, the second narrow rail portion 168 may be configured to be received within the second narrow groove portion 156 of the second clip groove 126 and the second enlarged rail portion 172 may be configured to be received within the second enlarged groove portion 160 of the second clip groove 126. Additionally, as particularly shown in FIG. 7, each enlarged rail portion 170, 172 may be configured to define a radial height 174 that is greater than a corresponding radial height 176 of each narrow rail portion 166, 168.

It should be appreciated that the radial heights 174 for the enlarged rail portions 170, 172 of the outer rails 148 of the retention clips 106, 108 may be configured to be greater than the radial heights 164 for the narrow groove portions 154, 156 of the clip grooves 124, 126. As a result, the outer rail 148 of each retention clip 106, 108 may not be inserted circumferentially into its corresponding clip groove 124, 126. Rather, the outer rails 148 may be configured to be slid axially into their corresponding clip grooves 124, 126. For example, as shown in FIG. 4, each clip groove 124, 126 may include an open axial end 178 located at or adjacent to the aft end 116 of the outer hanger wall 110. As such, the outer rail 148 of each retention clip 106, 108 may be configured to be inserted into its corresponding clip groove 124, 126 at the groove's open axial end 178 and subsequently slid axially in the direction of the forward end 118 of the outer hanger wall 110 in order to couple the retention clips 106, 108 to the shroud hanger.

Moreover, in several embodiments, the outer shroud wall 140 of the shroud segment 104 may define clip recesses 180, 182 for recessing each retention clip 106, 108 relative to the circumferential ends 130, 132 of the shroud segment 104. For example, as shown in FIG. 5, a first clip recess 180 may be defined by the outer shroud wall 140 at the first circumferential end 130 of the shroud segment 104 for receiving the clip wall 150 of the first retention clip 106. Similarly, a second clip recess 182 may be defined by the outer shroud wall 140 at the second circumferential end 132 of the shroud segment 104 for receiving the clip wall 150 of the second retention clip 108. As such, when the retention clips 106, 108 are properly placed relative to the shroud segment 104, each clip wall 150 may be received within its respective clip recess 180, 182 such that a side face 184 (FIG. 6) defined by the clip wall 150 is circumferentially aligned with the adjacent circumferential end 130, 132 of the shroud segment 104. Such circumferential recessing of the retention clips 106, 108 may allow the shroud segment 104 to be assembled end-to-end with other similarly configured shroud segments in an annular array so as to form the 360 degree, ring-shaped turbine shroud of the gas turbine engine.

Further, as particularly shown in FIG. 6, when the various components of the disclosed system 100 are assembled together, the inner rails 146 of the retention clips 106, 108 may be configured to engage or contact corresponding end portions 186, 188 of the inner surface 152 of the outer shroud wall 140 of the shroud segment 104. Specifically, the inner rail 146 of the first retention clip 106 may be configured to engage or contact a first end portion 186 of the inner surface 152 extending circumferentially from the first clip recess 180 in the direction of the second circumferential end 132 of the shroud segment 104. Similarly, the inner rail 146 of the second retention clip 108 may be configured to engage or contact a second end portion 188 of the inner surface 152 extending circumferentially from the second clip recess 182 in the direction of the first circumferential end 130 of the shroud segment 104. In such an embodiment, to facilitate flush contact between the end portions 186, 188 of the inner surface 152 and the inner rails 146, the end portions 186, 188 may be machined or otherwise formed so as to define generally planar profiles or surfaces as opposed to the arcuate profile or surface defined by the remainder of the inner surface 152. For example, as particularly shown in FIG. 5, the inner surface 152 includes a central portion 190 extending circumferentially between the first and second end portions 186, 188, with the central portion 190 defining a generally arcuate or curved profile/surface and each end portion 186, 188 defining a generally planar, flat profile/ surface disposed radially outwardly from the central portion 190. Thus, when the retention clips 106, 108 are installed relative to the shroud segment 104 such that the clips walls 150 are received within their corresponding clip recesses 180, 182 defined at the circumferential ends 130, 132 of the shroud segment 104, the end portions 186, 188 of the inner surface 152 may be seated flush against the inner rails 146 of the retention clips 106, 108.

As indicated above, it should be appreciated that the disclosed retention clips 106, 108 may be utilized to couple the shroud segment 104 to the shroud hanger 102 without requiring an interference fit. Given the "looser" fit provided by the disclosed retention system 100, a nominal gap 192 (FIG. 6) may be defined between the outer shroud wall 140 and the outer hanger wall 110 when the shroud segment 104 is coupled to the shroud hanger 102 and the gas turbine engine 10 is not operating. In one embodiment, the radial height of the gap 192 may be selected such that, as the system components thermally expand during operation of the gas turbine engine 10, the outer shroud wall 140 contacts the outer hanger wall 110 only when the gas turbine engine 10 is operating at its maximum operating conditions (e.g., its maximum operating temperatures). In such an embodiment, during all other operating conditions, a slight gap may be maintained between the outer shroud wall 140 and the outer hanger wall 110.

It should also be appreciated that, in one embodiment, the various components of the disclosed retention system 100 may be assembled by initially positioning the retention clips 106, 108 adjacent to the circumferential ends 130, 132 of the shroud segment 104 such that the clip walls 150 are received with their corresponding clip recesses 180, 182 and the inner rails 146 extend adjacent to and/or contact the inner surface 152 of the outer shroud wall 140 (e.g., at the ends portions 186, 188 of the inner surface 152). The assembled shroud segment 104 and retention clips 106, 108 may then be positioned relative to the shroud hanger 102 so that the outer rails 148 are aligned with the clips grooves 124, 126 at their open axial ends 178. The assembled shroud segment 104 and retention clips 106, 108 may then be slid axially relative to the shroud hanger 102 such that the outer rails 148 are received with the clip grooves 124, 126.

Additionally, it should be appreciated that, although the retention clips 106 108 were generally described above as being installed axially relative to the shroud hanger 102 and shroud segment 104, the retention clips 106, 108 may, in alternative embodiments, be configured to be installed circumferentially relative to the shroud hanger 102 and shroud segment 104. In such embodiments, the clips grooves 124, 126 described above may be configured to be defined in the turbine hanger 102 along the forward and aft ends 118, 116 of the outer hanger wall 110 such that the clip grooves 124, 126 extend circumferentially along the outer hanger wall 110. Moreover, in such embodiments, the configuration of the shroud segment 104 may also be modified, as necessary, to accommodate such circumferentially installed retention clips.

Figure 8:
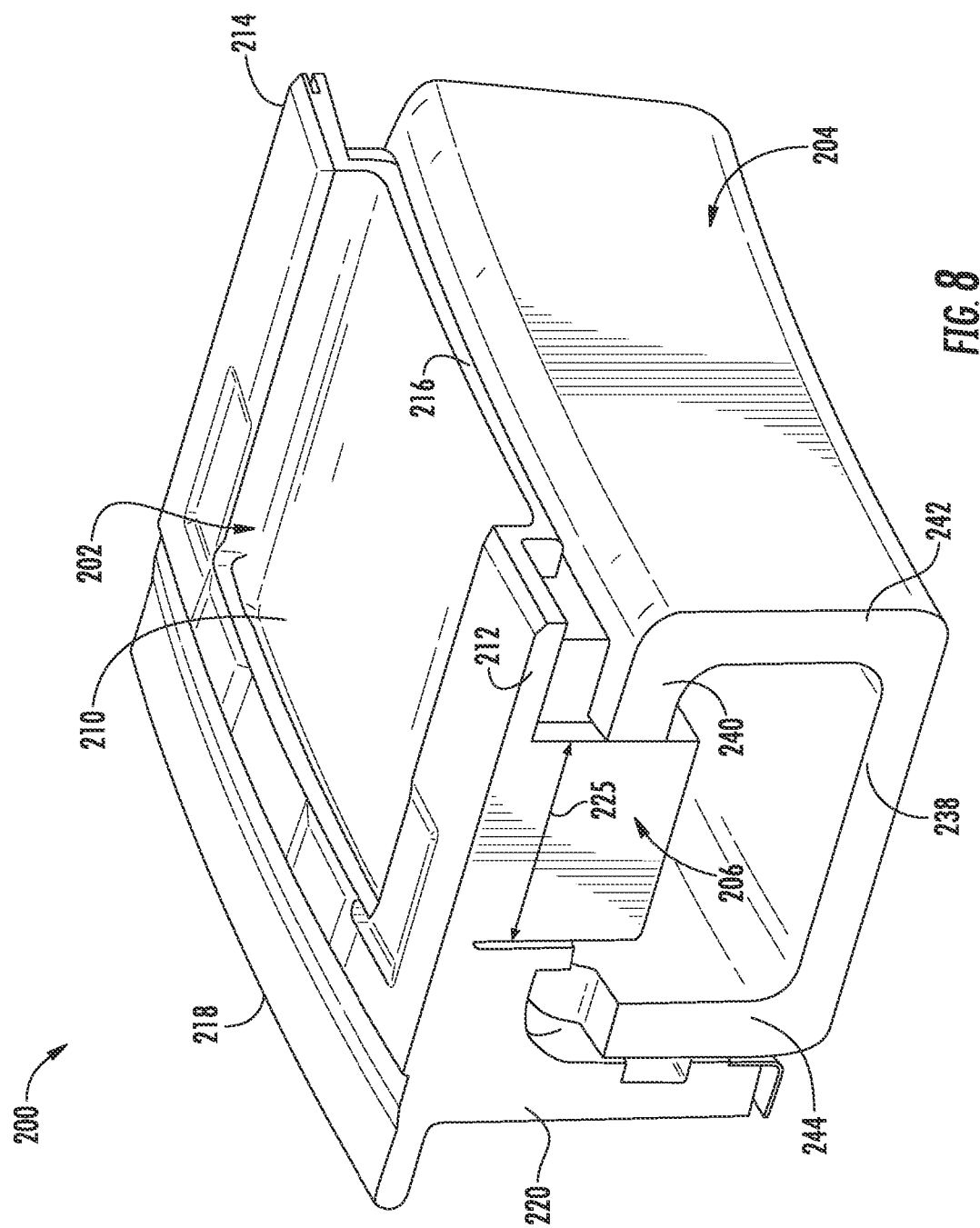
FIG. 8 illustrates a perspective view of another embodiment of a shroud retention system in accordance with aspects of the present subject matter, particularly illustrating a shroud hanger, a shroud segment and a retention spring of the system being assembled together.
Figure 9:
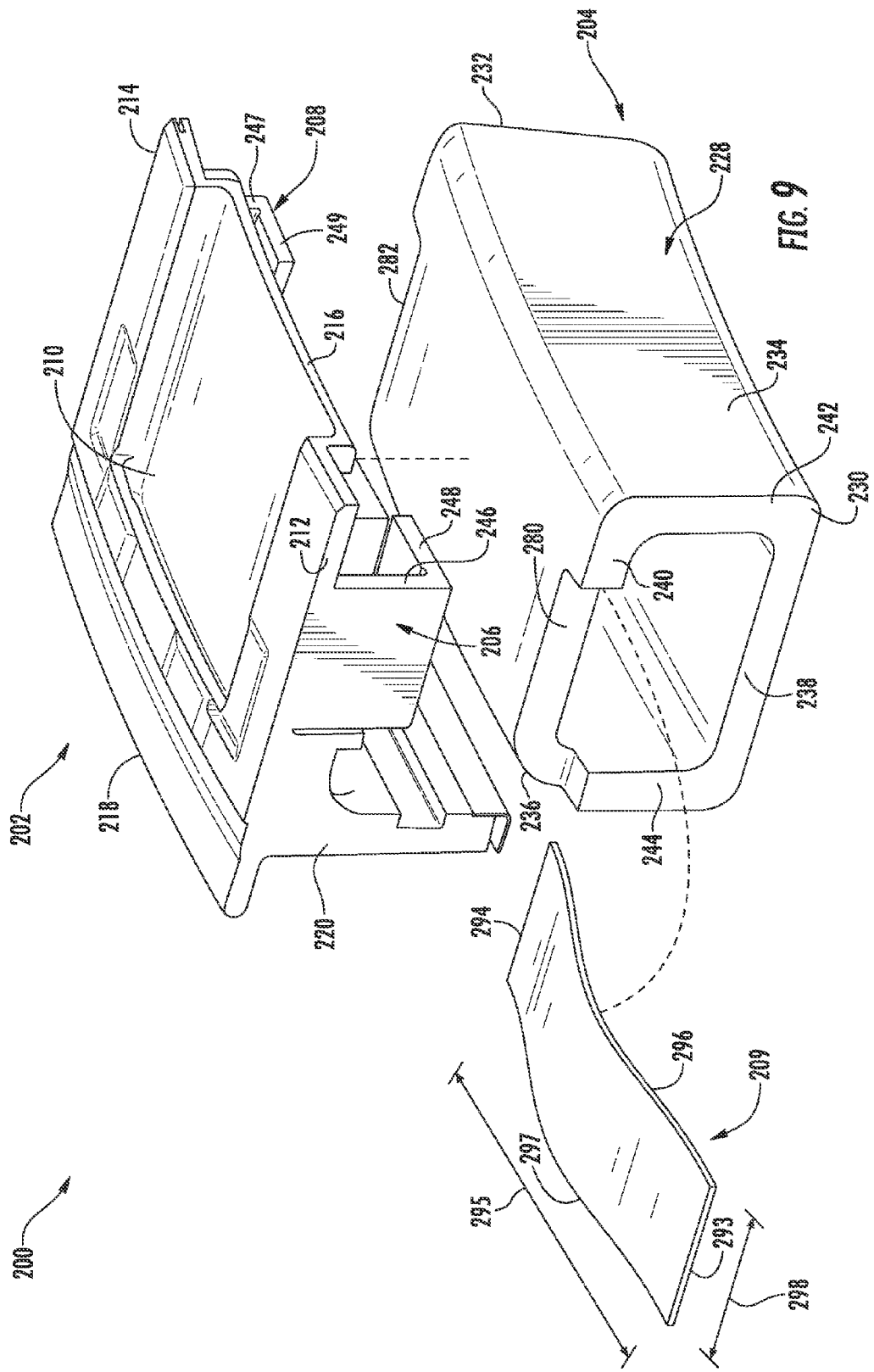
FIG. 9 illustrates another perspective view of the shroud retention system shown in FIG. 8, particularly illustrating the shroud hanger, the shroud segment and the retention spring exploded away from one another.
Figure 10:
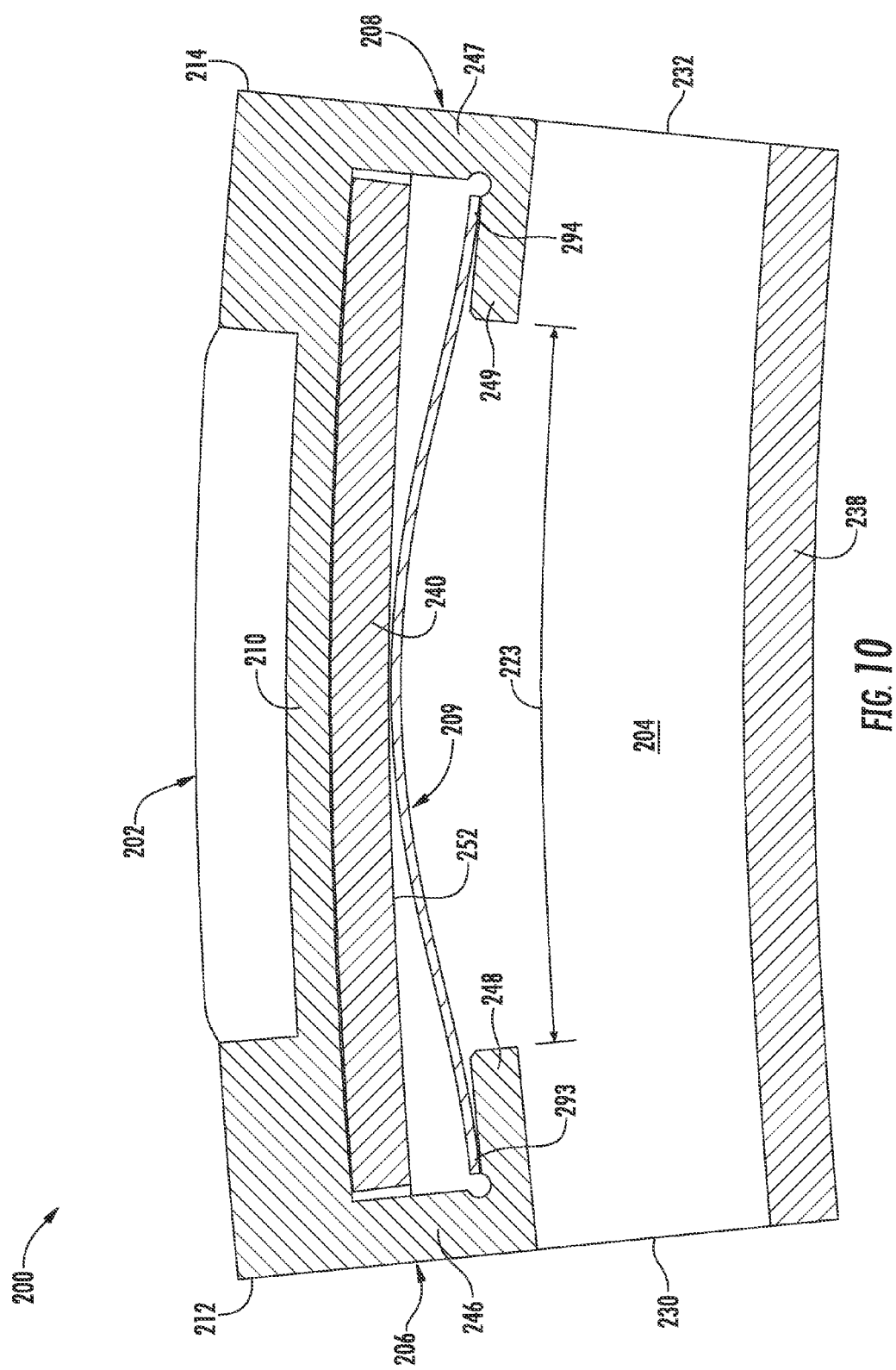
FIG. 10 illustrates a cross-sectional view of the assembled system components shown in FIG. 8 taken about line 10-10.

Referring now to FIGS. 8-10, several views of another embodiment of a shroud retention system 200 are illustrated in accordance with aspects of the present subject matter. Specifically, FIG. 8 illustrates a perspective view of various components of the retention system 200 assembled together and FIG. 9 illustrates a perspective view of the various system components exploded away from one another. Additionally, FIG. 10 illustrates a cross-sectional view of the assembled system components shown in FIG. 8 taken about line 10-10.

As shown in the illustrated embodiment, the retention system 200 may generally include a shroud hanger 202 and a shroud segment 204 configured to be coupled to the shroud hanger 202 via first and second retention hooks 206, 208. In addition, the system 200 includes a retention spring 209 configured to be engaged against the shroud segment 204 so as to apply a radial biasing or spring force against the shroud segment 204. As such, the shroud segment 204 may be radially retained at a suitable location relative to the shroud hanger 202 for defining a portion of the outer radial flowpath of the combustion products flowing through the turbine.

As particularly shown in FIGS. 8 and 9, the shroud hanger 202 may generally be configured similarly to the shroud hanger 102 described above with reference to FIGS. 3-7. For example, the shroud hanger 202 may include an upper or outer hanger wall 210 configured to extend circumferentially between a first end 212 and a second end 214 and axially between a forward end 218 and an aft end 216. In addition, the shroud hanger 202 may also include a forward wall 220 extending radially inwardly from the outer hanger wall 210 at a location at or adjacent to its forward end 218.

However, unlike the shroud hanger 102 described above, the shroud hanger 202 shown in FIGS. 8-10 may include first and second retention hooks 206, 208 extending radially inwardly from the outer hanger wall 210 at its opposed circumferential ends 212, 214. In several embodiments, each retention hook 206, 208 may include a hook wall 246, 247 configured to extend radially inwardly from the outer hanger wall 210 and an inner hook rail 248, 249 extending circumferentially from its corresponding hook wall 246, 247. For example, as particularly shown in FIG. 10, the first retention hook 206 may include a first hook wall 246 extending radially inwardly from the outer hanger wall 210 at its first circumferential end 212 and a first inner hook rail 248 extending circumferentially from the first hook wall 246 in the direction of the second retention hook 208. Similarly, the second retention hook 208 may include a second hook wall 247 extending radially inwardly from the outer hanger wall 210 at its second circumferential end 214 and a second inner hook rail 249 extending circumferentially from the second hook wall 247 in the direction of the first retention hook 206. As will be described below, the inner hook rails 248, 249 may generally be configured to extend outwardly from their corresponding hook walls 246, 247 such that the hook rails 248, 249 define support surfaces or shelves for radially supporting the shroud segment 204 relative to the shroud hanger 202.

It should be appreciated that, in several embodiments, the retention hooks 206, 208 may be formed integrally with the outer hanger wall 210, such as by forming the entire shroud hanger 202 as a single unitary component. Alternatively, the retention hooks 206, 208 may be configured to be rigidly coupled to the outer hanger wall 210 using any suitable attachment means, such as by welding the components together or by using suitable mechanical fasteners.

Referring still to FIGS. 8-10, the shroud segment 204 may generally be configured the same as the shroud segment 104 described above with reference to FIGS. 3-7. For example, the shroud segment 204 may include a shroud body 228 configured to extend circumferentially along an arcuate path between first and second circumferential ends 230, 232 and axially between a forward shroud end 236 and an aft shroud end 234. As particularly shown in FIG. 9, the shroud segment 204 may, in several embodiments, correspond to a box-type shroud segment. Thus, the shroud body 228 may be configured to define a generally rectangular cross-sectional shape. For example, as shown in FIG. 9, the shroud body 228 may include a radially inner shroud wall 238, a radially outer shroud wall 240, and forward and aft walls 244, 242 extending radially between the inner and outer shroud walls 238, 240 so as to define the rectangular, box-like cross-sectional shape.

Additionally, as shown in FIG. 10, the outer shroud wall 240 may define an inner surface 252 extending circumferentially between the first and second circumferential ends 230, 232 of the shroud segment 204. Moreover, in several embodiments, the outer shroud wall 240 may define hook recesses 280, 282 for recessing each retention hook 206, 208 relative to the circumferential ends 230, 232 of the shroud segment 204. For example, as shown in FIG. 9, a first hook recess 280 may be defined by the outer shroud wall 240 at the first circumferential end 230 of the shroud segment 204 for receiving the hook wall 246 of the first retention hook 206. Similarly, a second clip recess 282 may be defined by the outer shroud wall 240 at the second circumferential end 232 of the shroud segment 204 for receiving the hook wall 247 of the second retention hook 208.

To allow the shroud segment 204 to be coupled to the shroud hanger 202, the shroud segment 204 may be installed relative to the hanger 202 such that the outer shroud wall 240 extends circumferentially between the retention hooks 206, 208 in a manner that allows the shroud wall 240 to be radially supported by the inner hook rails 248, 249 of the retention hooks 206, 208. For example, as particularly shown in FIG. 10, the outer shroud wall 240 may be inserted between the retention hooks 206, 208 such that the shroud wall 240 extends circumferential between the hook walls 246, 247 of the retention hooks 206, 208 at a location radially outwardly from the inner hook rails 248, 249. As such, the hook rails 248, 249 may serve as a radially inner mechanical stop for the outer shroud wall 240.

Additionally, as indicated above, the disclosed retention system 200 may also include a retention spring 209 configured to be engaged against the shroud segment 204 so as to apply a radial biasing or spring force against the shroud segment 204. Specifically, as shown in FIG. 10, in several embodiments, the retention spring 209 may be positioned radially between the outer shroud wall 240 and the inner hook rails 248, 249 such that the spring 209 applies a radial spring force against the shroud segment 204 that biases the outer shroud wall 240 radially outwardly in the direction of the outer hanger wall 210 of the shroud hanger 202. For example, in one embodiment, the retention spring 209 may be configured to apply a radial spring force against the shroud segment 204 such that the outer shroud wall 240 is biased into engagement or otherwise contacts the outer hanger wall 210. As such, the retention spring 209 may provide a means for positively locating the shroud segment 204 relative to the shroud hanger 202.

As shown in FIGS. 9 and 10, in several embodiments, the retention spring 209 may comprise an elongated strip of material (e.g., spring steel or any other suitable material) that is bowed or arced along its length. For example, in one embodiment, the strip of material may be configured as a leaf spring to permit the retention spring 209 to be loaded as it is flexed or bowed onto an arcuate shape. As a result, when the retention spring 209 is compressed radially, the spring 209 may apply a reactive spring force that may be utilized to radially retain the shroud segment 204 relative to the shroud hanger 202.

In general, the retention spring 209 may be configured to extend circumferentially between a first spring end 293 and a second spring end 294, with a circumferential length 295 of the spring 209 being defined between its first and second spring ends 293, 294. In several embodiments, the circumferential length 295 of the retention spring 209 may be greater than a circumferential gap 223 (FIG. 10) defined between the inner hook rails 248, 249 of the retention hooks 206, 208. As such, the retention spring 209 may be placed circumferentially between the hook walls 246, 247 of the retention hooks 206, 208 so that the first and second spring ends 293, 294 contact or otherwise engage the inner first and second hook rails 248, 250, respectively. For example, as shown in FIG. 10, the retention spring 209 may be configured to extend circumferentially between the hook walls 246, 247 such that the first spring end 293 engages the first hook rail 248 at a location adjacent to the first hook wall 246 and the second spring end 294 engages the second hook rail 249 at a location adjacent to the second hook wall 247.

Additionally, as shown in FIG. 9, the retention spring 209 may also be configured to extend axially between a forward spring end 297 and an aft spring end 296, with an axial width 298 of the retention spring 209 being defined between the forward and aft spring ends 297, 296. In one embodiment, the axial width 298 of the retention spring 209 may be equal to or substantially equal to an axial width 225 (FIG. 8) of the retention hooks 206, 208. However, in other embodiments, the axial width 298 of the retention spring 209 may be greater than or less than the axial width 225 of the retention hooks 206, 208.

It should be appreciated that, in one embodiment, the various components of the disclosed retention system 200 may be assembled by initially installing the shroud segment 204 relative to the shroud hanger 202 such that the outer shroud wall 240 extends circumferentially between the hook walls 246, 247 of the retention hooks 206, 208 at a location radially outwardly from the inner hook rails 248, 249. This may be performed, for example, by installing the shroud segment 204 one end at a time between the retention hooks 206, 208, such as by angling the shroud segment 204 so that the portion of the outer shroud wall 240 at the first circumferential end 230 of the shroud segment 204 is initially positioned relative to the first retention hook 206 and then the portion of the outer shroud wall 240 at the second circumferential end 232 of the shroud segment 204 is lifted radially outwardly and positioned relative to the second retention hook 208. Thereafter, the retention spring 209 may be positioned radially between the outer shroud wall 240 and the inner hook rails 248, 249 such that the retention spring 209 applies a radially upward biasing force against the shroud segment 204.

Figure 11:
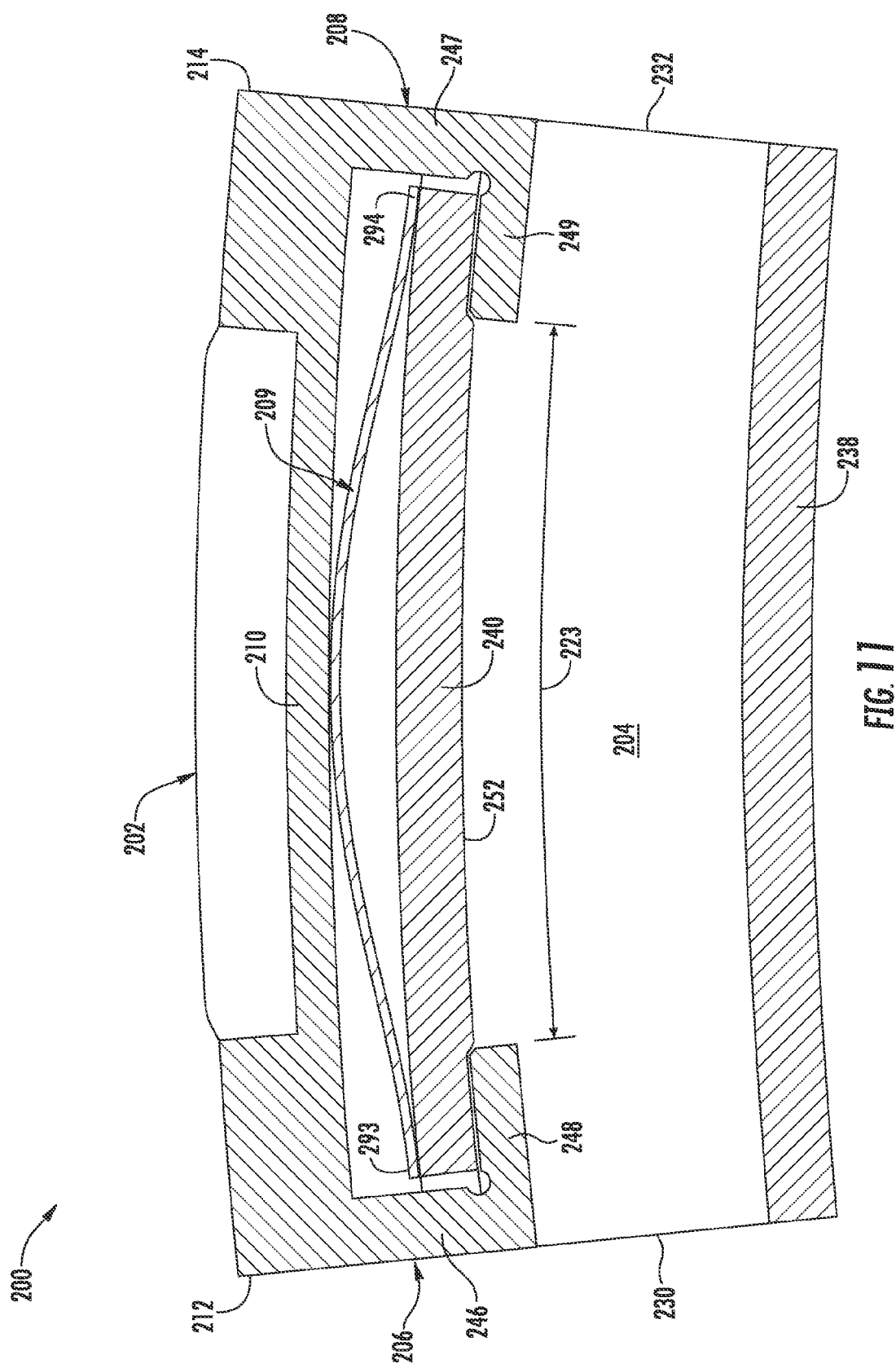
FIG. 11 illustrates a similar cross-sectional view of the assembled system components shown in FIG. 10, particularly illustrating an alternative configuration for positioning the retention spring relative to the shroud hanger and the shroud segment.

Referring now to FIG. 11, a cross-sectional view of an alternative embodiment of the shroud retention system 200 described above with reference to FIGS. 8-10 is illustrated in accordance with aspects of the present subject matter. As shown in FIG. 11, unlike the embodiment described above, the retention spring 209 is position radially between the outer hanger wall 210 and the outer shroud wall 240. As such, the retention spring 209 may be configured to apply a radial spring force against the shroud segment 204 that biases the outer shroud wall 240 radially inwardly relative to the shroud hanger 202. For example, the retention spring 209 may apply a radially inward force against the shroud segment 204 that biases the outer shroud wall 240 against inner hook rails 248, 249 of the retention hooks 206, 208 so that the inner surface 252 of the outer shroud wall 240 contacts the hook rails 248, 249, thereby positively locating the shroud segment 204 relative to the shroud hanger 22.

Figure 12:
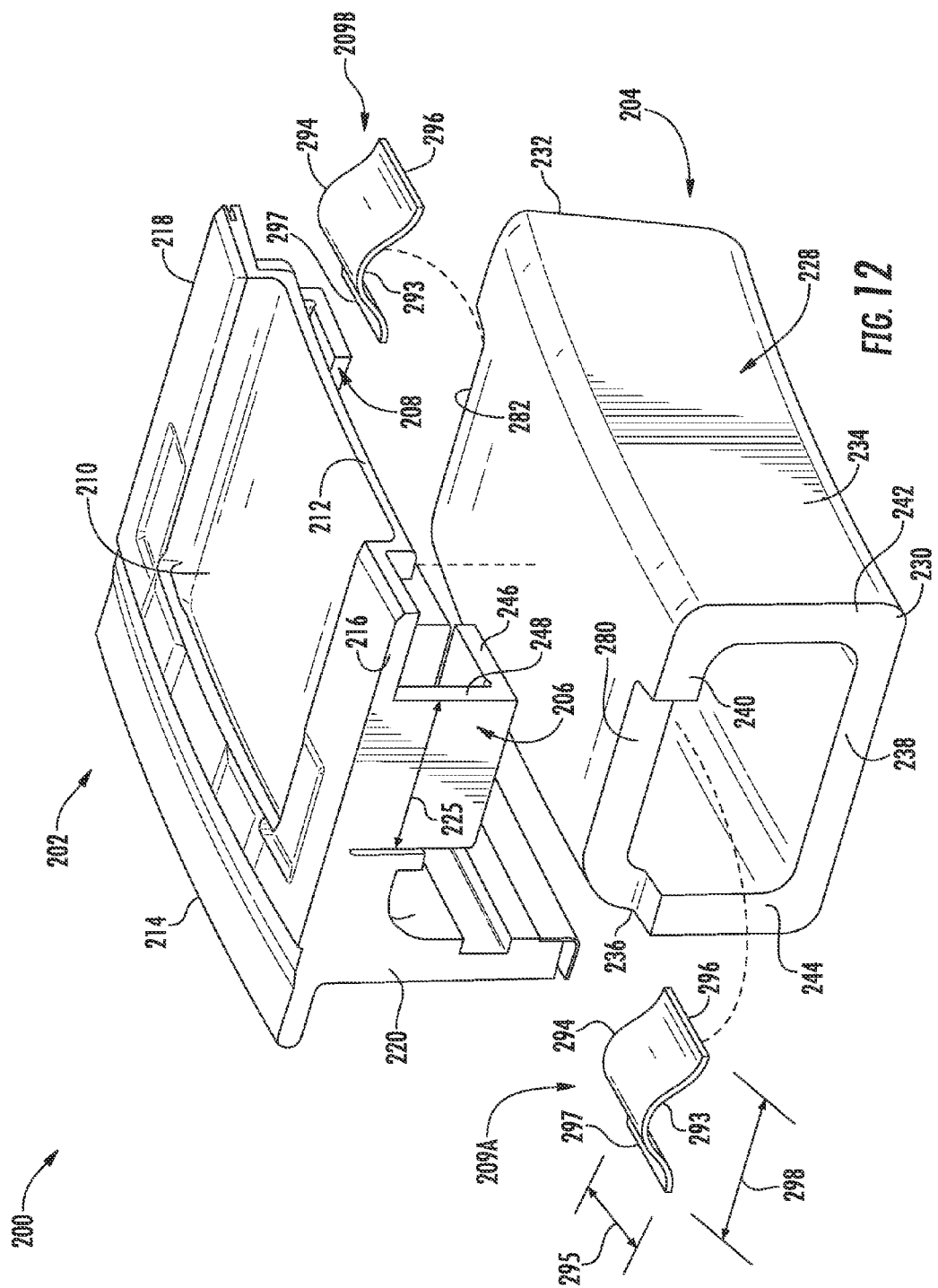
FIG. 12 illustrates a similar exploded view of the system components shown in FIG. 9, particularly illustrating an alternative embodiment in which the retention spring is replaced with two smaller, separate retention springs.
Figure 13:
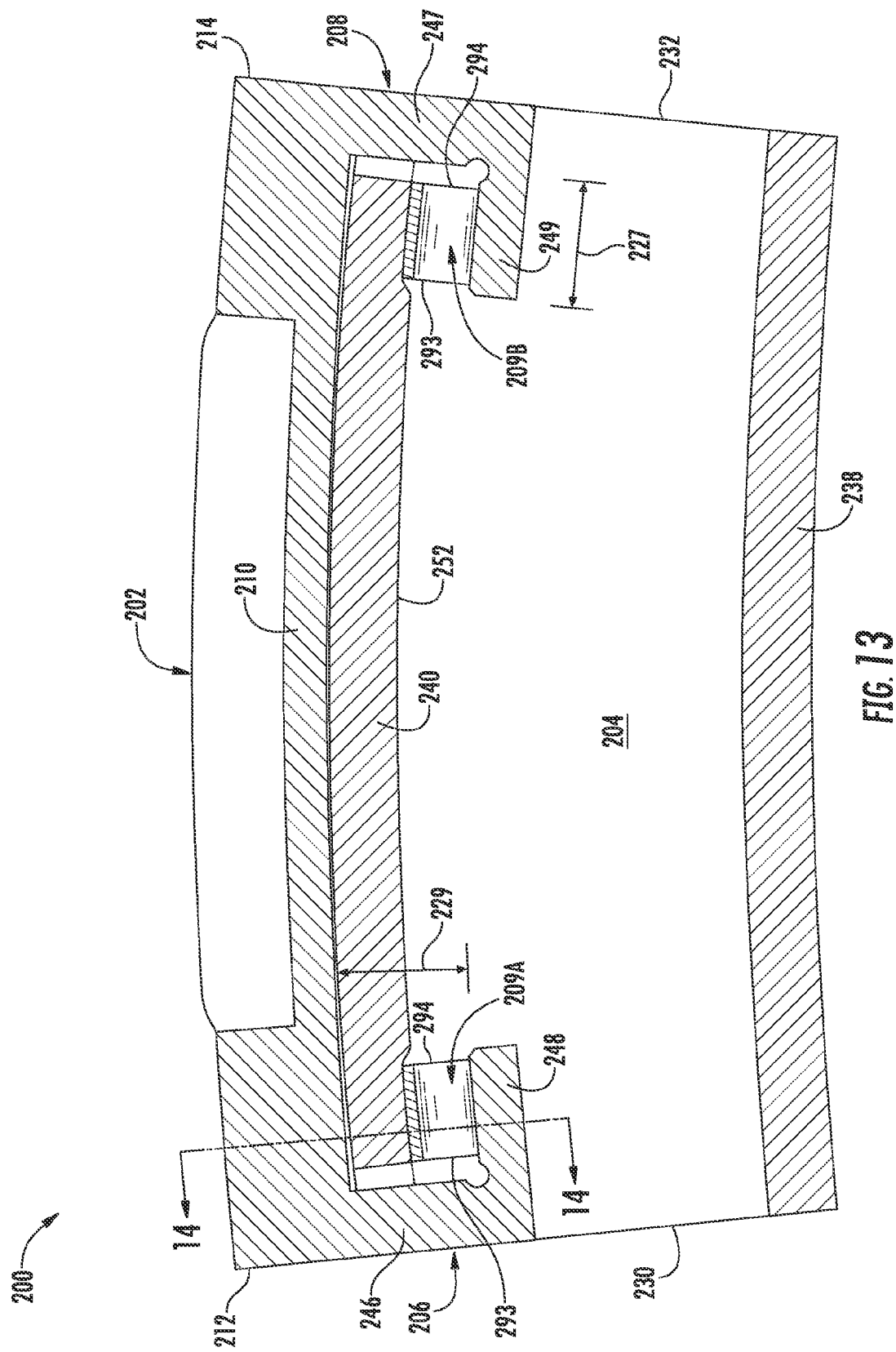
FIG. 13 illustrates a circumferential cross-sectional view of the various system components shown in FIG. 12 after such components have been assembled together.
Figure 14:
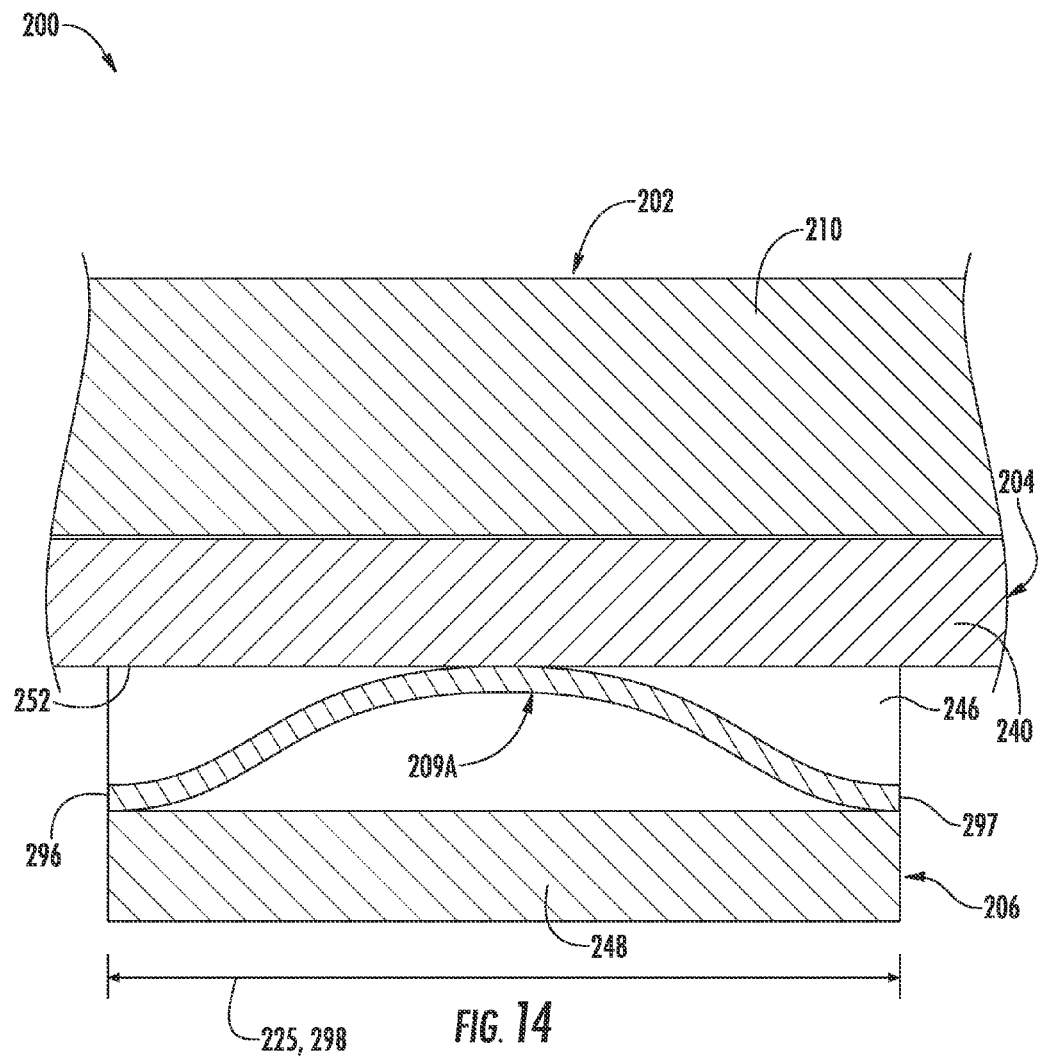
FIG. 14 illustrates an axial cross-sectional view of the assembled system components shown in FIG. 13 taken about line 14-14.

Referring now to FIGS. 12-14, another alternative embodiment of the shroud retention system 200 described above with reference to FIGS. 8-10 is illustrated in accordance with aspects of the present subject matter. Specifically, FIG. 12 illustrates an exploded view of the various components of the retention system 200. Additionally, FIG. 13 illustrates a circumferential cross-sectional view of the various components shown in FIG. 12 after such components were assembled and FIG. 14 illustrates an axial cross-sectional view of the components shown in FIG. 13 taken about line 14-14.

As shown in FIGS. 12-14, unlike the embodiment described above with reference to FIGS. 8-10, the retention system 200 includes first and second retention springs 209A, 209B configured to provide a means for radially retaining/positioning the shroud segment 204 relative to the shroud hanger 202. In general, the retention springs 209A, 209B may be configured similarly to the retention spring 209 described above. For example, each retention spring 209A, 209B may comprise an elongated strip of material (e.g., spring steel or any other suitable material) that is bowed or arced along its length such that, when the retention spring 209A, 209B is compressed radially, the spring 209A, 209B applies a reactive spring force against the shroud segment 204. In addition, each retention spring 209A, 209B may be configured to extend circumferentially between a first spring end 293 and a second spring end 294, with a circumferential length 295 of each spring 209A, 209B being defined between its first and second spring ends 293, 294. Moreover, each retention spring 209A, 209B may also be configured to extend axially between a forward spring end 297 and an aft spring end 296, with an axial width 298 of each retention spring 209A, 209B being defined between the forward and aft spring ends 297, 296.

However, unlike the embodiment described above, the circumferential lengths 295 and/or axial widths 298 of the retention springs 209A, 209B may be selected such that each retention spring 209A, 209B is configured to extend lengthwise at a location adjacent to each retention hook 206, 208. For example, as shown in FIG. 13, in one embodiment, the circumferential length 295 of each retention spring 209A, 209B may be less than or equal to a circumferential length 227 corresponding to the length that each inner hook rail 248, 249 extends outwardly from its respective hook wall 246, 247. As such, the retention springs 209A, 209B may be spaced circumferentially apart from one another, with each retention spring 209A, 209B being positioned within a radial space 229 defined directly between the outer hanger wall 210 and each hook rail 248, 249. For instance, as shown in FIG. 13, the first retention spring 209A may be positioned directly adjacent to the first hook wall 246 such that it extends circumferentially within the radial space 229 defined between the outer hanger wall 210 and the first hook rail 248. Similarly, the second retention spring 209B may be positioned directly adjacent to the second hook wall 247 such that it extends circumferentially within the radial space 229 defined between the outer hanger wall 210 and the second hook rail 249. It should be appreciated that, in alternative embodiments, the circumferential length 295 of each retention spring 209A, 209B may be greater than the circumferential length 227 defined by the hook rails 248, 249 so that the retention springs 209A, 209B extend circumferentially beyond the radial spaces 229 defined between the outer hanger wall 210 and the hook rails 248, 249.

It should be appreciated that, in the illustrated embodiment, the retention springs 209A, 209B are radially positioned directly between the outer shroud wall 240 and the hook rails 248, 249. However, in other embodiments, the retention springs 209A, 209B may be radially positioned directly between the outer hanger wall 210 and the outer shroud wall 240 (e.g., similar to the radial positioning of the retention spring 209 t shown in FIG. 11).

Additionally, in several embodiments, the axial width 298 of each retention spring 209A, 209B may generally correspond to the axial width 225 of the retention hooks 206, 208. For example, as shown in FIG. 13, the axial width 298 of each retention spring 209A, 209B may be selected such that the retention spring 209A, 209B extends lengthwise along the entire axial width 225 of the retention hook 206, 208. However, in other embodiments, the axial width 298 of each retention spring 209A, 209B may be less than or greater than the axial widths 225 of the retention hooks 206, 208. For example, considering the view shown in FIG. 14, if the retention spring 209A was flipped upside down or installed between the outer hanger wall 210 and the outer shroud wall 240 as opposed to between the outer shroud wall 210 and the hook rail 248, the axial width 298 of the retention spring 209A may be greater than the axial width 225 of the retention hook 206.

Figure 15:
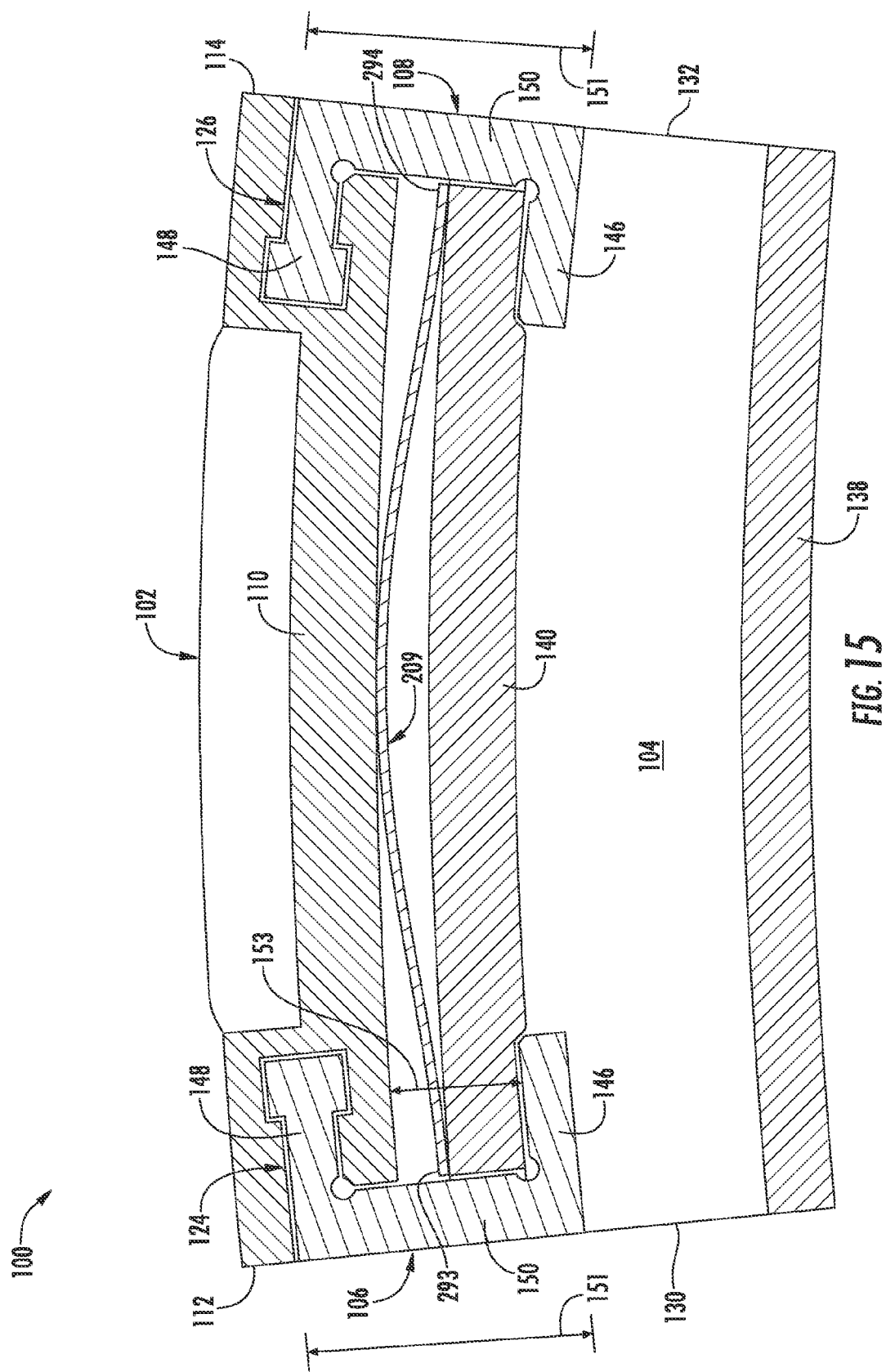
FIG. 15 illustrates a similar cross-sectional view of the assembled system components shown in FIG. 6, particularly illustrating an alternative embodiment in which the illustrated retention system further includes a retention spring.

It should be appreciated that, although the retention clips 106, 108 and retention spring(s) 209, 209A, 209B were generally described above as being implemented with separate embodiments of a shroud retention system, the retention clips 106, 108 and spring(s) 209, 209A, 209B may also be utilized in combination to provide an effective means for radially retaining/positioning a shroud segment relative to a shroud hanger. For example, FIG. 15 illustrates an alternative embodiment of the retention system 100 described above with reference to FIGS. 3-7 that includes both retention clips 106, 108 and a retention spring 209. Specifically, FIG. 15 illustrates a circumferential cross-sectional view similar to that shown in FIG. 6 with a retention spring 209 being added that extends circumferentially between the retention clips 106, 108.

As shown in FIG. 15, to allow the retention spring 209 to be installed within the illustrated retention system 100, a radial height 151 of the retention clips 106, 108 may be increased (as compared to the radial height of the retention clips 106, 108 described above with reference to FIGS. 3-7) such that a radial gap 153 is defined between the outer hanger wall 110 and the inner rails 146 of the retention clips 106, 108 that accommodates both the outer shroud wall 140 and the retention spring 209. For example, as shown in the illustrated embodiment, the retention spring 209 is radially positioned directly between the outer hanger wall 110 and the outer shroud wall 140. As such, the retention spring 209 may be configured to apply a radial spring force against the shroud segment 104 that biases the outer shroud wall 140 radially inwardly relative to the shroud hanger 102. For example, the retention spring 209 may apply a radially inward force against the shroud segment 104 that biases the outer shroud wall 140 against the inner rails 146 of the retention clips 106, 108 so that the inner surface 152 of the outer shroud wall 140 (e.g., the end portions 186, 188 of the inner surface 152) contacts the inner rails 146, thereby positively locating the shroud segment 104 relative to the shroud hanger 102.

Figure 16:
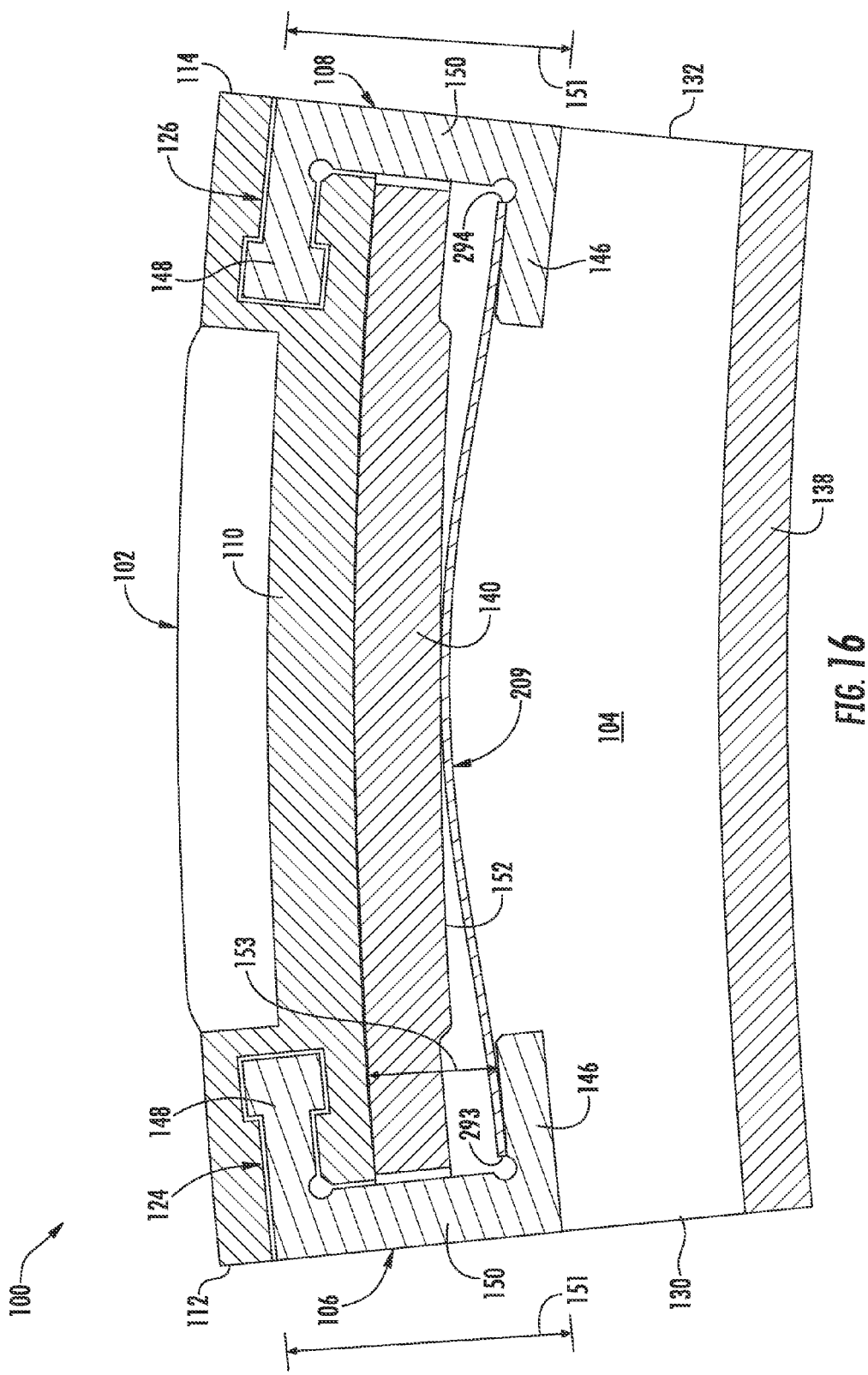
FIG. 16 illustrates a similar cross-sectional view of the assembled system components shown in FIG. 15, particularly illustrating an alternative configuration for positioning the retention spring relative to the shroud hanger and the shroud segment.

Alternatively, the retention spring 209 may be configured to be radially positioned directly between the outer shroud wall 140 and the inner rails 146 of the retention clips 106, 108. For example, FIG. 16 illustrates a similar cross-sectional view to that shown in FIG. 15 with the retention spring 209 installed directly between the outer shroud wall 140 and the inner rails 146. In such an embodiment, the retention spring 209 may be configured to apply a radial spring force against the shroud segment 104 that biases the outer shroud wall 140 radially outwardly in the direction of the outer hanger wall 110. For example, in one embodiment, the retention spring 209 may be configured to apply a radial spring force against the shroud segment 104 such that the outer shroud wall 140 is biased into engagement or otherwise contacts the outer hanger wall 110. As such, the retention spring 209 may provide a means for positively locating the shroud segment 104 relative to the shroud hanger 102.

In further embodiments, it should be appreciated that, as opposed to the single retention spring 209 shown in FIGS. 15 and 16, two separate retention springs may be installed between the outer hanger wall 110 and the inner rails 146 of the retention clips 106, 108. For example, the first and second retention springs 209A, 209B shown in FIGS. 12-14 may be installed within the radial space defined between the outer hanger wall 110 and the inner rails 146 (e.g., either radially inwardly or radially outwardly from the outer shroud wall 140) at locations adjacent to the first and second retention clips 106, 108, respectively, to assist in radially retaining/positioning the shroud segment 104 relative to the shroud hanger 102.

Figure 17:
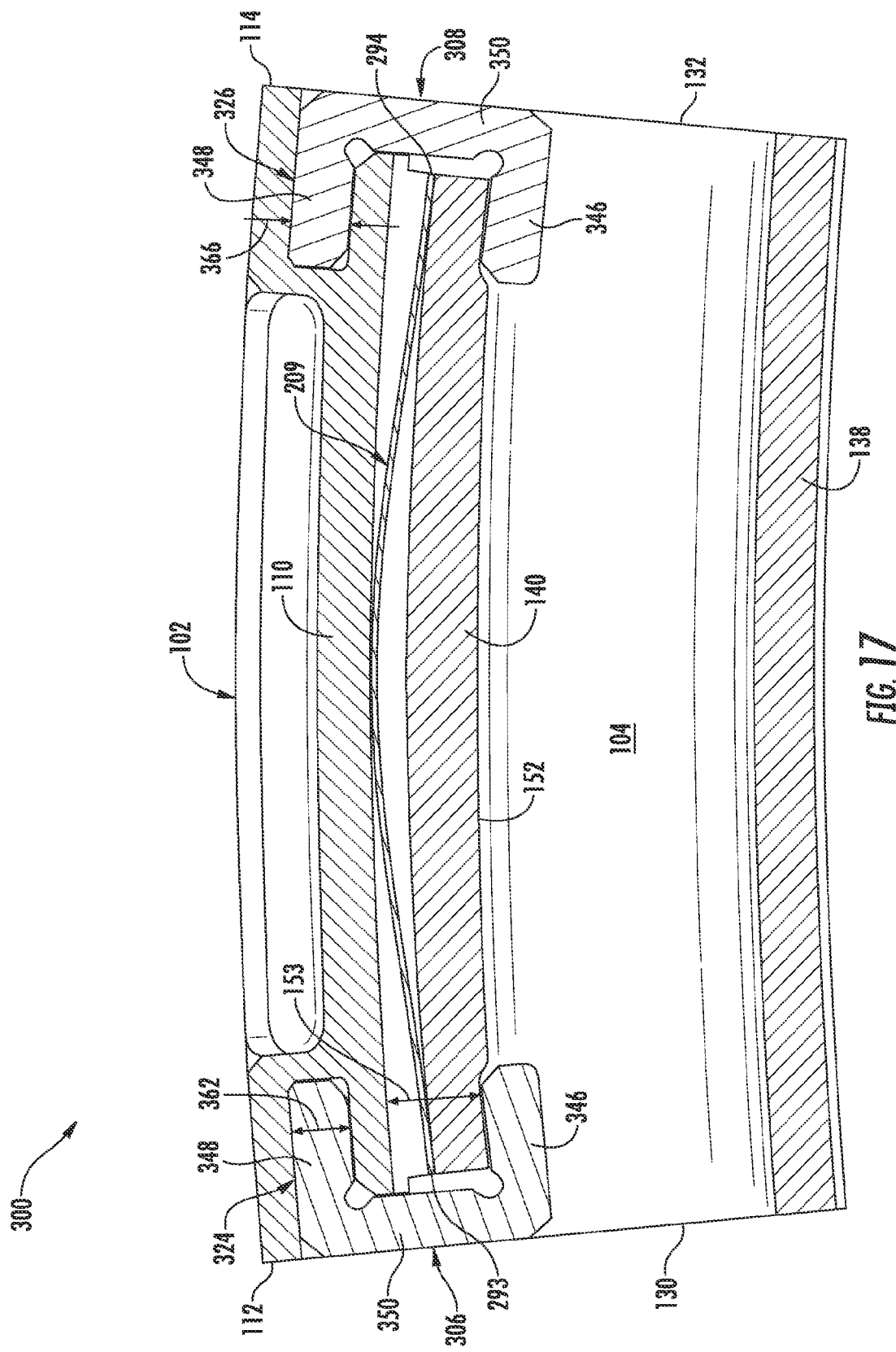
FIG. 17 illustrates a similar cross-sectional view of the assembled system components shown in FIG. 10, particularly illustrating an alternative embodiment in which retention hooks of the shroud hanger are replaced with separate C-clips for coupling the shroud segment to the shroud hanger.

It should also be appreciated that, in addition to utilizing the retention spring(s) 209, 209A, 209B in combination with the disclosed retention clips 106, 108, the retention spring(s) 209, 209A, 209B may also be used in combination with any other suitable clips or fastening means. For example, FIG. 17 illustrates a cross-sectional view yet another embodiment of a shroud retention system 300 in which the retention spring 209 may be used in combination with conventional C-clips 306, 308. As shown in FIG. 17, each C-clip 306, 308 may include an inner rail 346, an outer rail 348 and a clip wall 350 extending between the inner and outer rails 346, 348. However, unlike the retention clips 106, 108 described above, each outer rail 348 may be configured to define a uniform or constant radial height 366 as its extends circumferentially away from its respective clip wall 350. In such an embodiment, the outer hanger wall 110 of the shroud hanger 102 may be configured to define corresponding clip grooves 324, 326 for receiving the outer rails 348 of the C-clips 306, 308. For example, as shown in FIG. 17, similar to the outer rails 348, the clip grooves 324, 326 may define a uniform or constant radial height 362 along their circumferential length.

In one embodiment, the radial heights 362, 366 of the clip grooves 324, 326 and the outer rails 348 may be selected such that an interference fit is created solely between the C-clips 306, 308 and the outer hanger wall 110 when the outer rails 348 are received with the clip grooves 324, 326. In such an embodiment, a "loose" radial fit may still be provided for the outer shroud wall 140 of the shroud segment 104 between the outer hanger wall 110 and the inner rails 346 of the C-clips 306, 308. Accordingly, a sufficient radial gap 153 may be defined for accommodating both the outer shroud wall 140 and the retention spring 209 between outer hanger wall 110 and the inner rails 346 of the C-clips 306, 309.

As shown in FIG. 17, the retention spring 209 is radially disposed directly between the outer hanger wall 110 and the outer shroud wall 150. However, in other embodiments, the retention spring 209 may be radially disposed directly between the outer shroud wall 140 and the inner rails 346. Moreover, in further embodiments, two separate retention springs (e.g., springs 209A, 209B shown in FIGS. 12-14) may be installed within the radial space defined between the outer hanger wall 110 and the inner rails 346 (e.g., either radially inwardly or radially outwardly from the outer shroud wall 140) at locations adjacent to the C-clips 306, 308 to assist in radially retaining/positioning the shroud segment 104 relative to the shroud hanger 102.

It should be appreciated that the various shroud segments described herein may generally be formed from any suitable material. However, as indicated above, the shroud segments may in several embodiments, be formed from a non-metallic composite material. For instance, in a particular embodiment, the shroud segments may be formed from a ceramic matrix composite (CMC) material. In such an embodiment, the CMC material used to form the shroud segments may generally correspond to any suitable CMC material known in the art and, thus, may generally include a ceramic matrix having a suitable reinforcing material incorporated therein to enhance the material's properties (e.g., the material strength and/or the thermo-physical properties). In one embodiment, the CMC material used may be configured as a continuous fiber reinforced CMC material. For example, suitable continuous fiber reinforced CMC materials may include, but are not limited to, CMC materials reinforced with continuous carbon fibers, oxide fibers, silicon carbide monofilament fibers and other CMC materials including continuous fiber lay-ups and/or woven fiber preforms. In other embodiments, the CMC material used may be configured as a discontinuous reinforced CMC material. For instance, suitable discontinuous reinforced CMC materials may include, but are not limited to, particulate, platelet, whisker, discontinuous fiber, in situ and nano-composite reinforced CMC materials.

Additionally, it should be appreciated that, although the present subject matter has been generally described herein in reference to shroud segments having a box-like or rectangular cross-sectional shape, the disclosed retention clips and/or retention springs may generally be utilized with any shroud segment have any suitable configuration. For example, the disclosed retention clips may be utilized to couple a turbine hanger to a shroud segments having a single wall configuration or having a multiple wall configuration that differs from the box-type configuration described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A shroud retention system, comprising:
a shroud hanger including an outer hanger wall having a first end and a second end;
a first hooked component configured to extend from the outer hanger wall at the first end, the first hooked component including a first wall extending radially inwardly from the outer hanger wall and a first rail extending from the first wall in the direction of the second end of the outer hanger wall;
a second hooked component configured to extend from the outer hanger wall at the second end, the second hooked component including a second wall extending radially inwardly from the outer hanger wall and a second rail extending from the second wall in the direction of the first end of the outer hanger wall;

a shroud segment radially inward of the outer hanger wall, the shroud segment including an inner shroud wall and an outer shroud wall, the outer shroud wall radially outward of and connected to the inner shroud wall, the outer shroud wall extending between a first segment end and a second segment end, the first segment end configured to be positioned radially between the outer hanger wall and the first rail, the second segment end configured to be positioned radially between the outer hanger wall and the second rail and the inner shroud wall positioned radially inward of the first and second rails; and a retention spring positioned within a radial space defined radially inward of the outer shroud wall and radially outward of the first and second rails, the retention spring being configured to apply a radial spring force against the shroud segment.

2. The shroud retention system of claim 1, wherein the first and second hooked components are formed integrally with the shroud hanger.

3. The shroud retention system of claim 1, wherein the first and second hooked components correspond to separate C-clips configured to couple the shroud hanger to the shroud segment.

4. The shroud retention system of claim 1, wherein the retention spring extends circumferentially between the first and second walls.

5. The shroud retention system of claim 4, wherein the retention spring extends lengthwise between a first spring end and a second spring end, the first spring end being positioned adjacent to the first wall and the second spring end being positioned adjacent to the second wall.

6. The shroud retention system of claim 4, wherein the retention spring is radially positioned directly between the outer shroud wall and the first and second rails.

7. The shroud retention system of claim 1, wherein the retention spring comprises a first retention spring and a second retention spring positioned within the radial space defined radially inward of the outer shroud wall and radially outward of the first and second rails, the first and second retention springs being spaced circumferentially apart from one another.

8. The shroud retention system of claim 7, wherein the first retention spring is configured to extend lengthwise along the outer shroud wall at a first location adjacent to the first wall and wherein the second retention spring is configured to extend lengthwise along the outer shroud wall at a second location adjacent to the second wall.

9. The shroud retention system of claim 1, wherein the outer shroud wall defines an inner surface extending between the first and second segment ends, wherein the first rail is configured to be disposed radially inwardly relative to the outer shroud wall such that the first rail extends along a first portion of the inner surface defined adjacent to the first segment end, the second rail being configured to be disposed radially inwardly relative to the outer shroud wall such that the second rail extends along a second portion of the inner surface defined adjacent to the second segment end.

10. The shroud retention system of claim 1, wherein the retention spring is configured as a leaf spring.

11. The shroud retention system of claim 1, wherein the shroud segment is formed from a ceramic matrix composite material.

12. A shroud retention system, comprising:
a shroud hanger including an outer hanger wall having a first end and a second end, the shroud hanger further comprising a first retention hook extending from the outer hanger wall at the first end and a second retention hook extending from the outer hanger wall at the second end, the first retention hook including a first hook wall extending radially inwardly from the outer hanger wall and a first hook rail extending from the first hook wall in the direction of the second retention hook, the second retention hook including a second hook wall extending radially inwardly from the outer hanger wall and a second hook rail extending from the second hook wall in the direction of the first retention hook;

a shroud segment radially inward of the outer hanger wall, the shroud segment including an inner shroud wall and an outer shroud wall, the outer shroud wall radially outward of and connected to the inner shroud wall, the outer shroud wall extending between a first segment end and a second segment end, the first segment end configured to be positioned radially between the outer hanger wall and the first hook rail, the second segment end configured to be positioned radially between the outer hanger wall and the second hook rail and the inner shroud wall positioned radially inward of the first and second hook rails; and a retention spring positioned within a radial space defined radially inward of the outer shroud wall and radially outward of the first and second hook rails, the retention spring being configured to apply a radial spring force against the shroud segment.

13. The shroud retention system of claim 12, further comprising a circumferential gap defined between the first hook rail and the second hook rail, wherein the retention spring extends between the first and second hook walls.

14. The shroud retention system of claim 13, wherein the retention spring extends lengthwise between a first spring end and a second spring end, the first spring end being positioned adjacent to the first hook wall and the second spring end being positioned adjacent to the second hook wall and,
wherein the circumferential length of the retention spring is greater than the length of the circumferential gap.

15. The shroud retention system of claim 14, wherein the retention spring is radially positioned directly between the outer shroud wall and the first and second hook rails, and
wherein the retention spring further comprises an elongated strip of material that is bowed along its length.

16. The shroud retention system of claim 12, wherein the retention spring comprises a first retention spring and a second retention spring positioned within the radial space defined radially inward of the outer shroud wall and radially outward of the first and second hook rails, the first and second retention springs being spaced circumferentially apart from one another.

17. The shroud retention system of claim 16, wherein the first retention spring is configured to extend lengthwise along the outer shroud wall at a first location adjacent to the first hook wall and wherein the second retention spring is configured to extend lengthwise along the outer shroud wall at a second location adjacent to the second hook wall.

18. The shroud retention system of claim 12, wherein the shroud segment is formed from a non-metallic composite material.

19. The shroud retention system of claim 15, wherein the shroud segment is formed from a ceramic matrix composite material.

20. A gas turbine engine, comprising:
a compressor;
a combustor in fluid communication with the compressor;
a turbine downstream of the combustor; and a shroud retention system disposed within the turbine, the shroud retention system comprising:
  a shroud hanger including an outer hanger wall having a first end and a second end;
  a first hooked component configured to extend from the outer hanger wall at the first end, the first hooked component including a first wall extending radially inwardly from the outer hanger wall and a first rail extending from the first wall in the direction of the second end of the outer hanger wall;
  a second hooked component configured to extend from the outer hanger wall at the second end, the second hooked component including a second wall extending radially inwardly from the outer hanger wall and a second rail extending from the second wall in the direction of the first end of the outer hanger wall;
  a shroud segment radially inward of the outer hanger wall, the shroud segment including an inner shroud wall and an outer shroud wall, the outer shroud wall radially outward of and connected to the inner shroud wall, the outer shroud wall extending between a first segment end and a second segment end, the first segment end configured to be positioned radially between the outer hanger wall and the first rail, the second segment end configured to be positioned radially between the outer hanger wall and the second rail and the inner shroud wall positioned radially inward of the first and second rails; and
  a retention spring positioned within a radial space defined radially inward of the outer shroud wall and radially outward of the first and second rails, the retention spring being configured to apply a radial spring force against the shroud segment.

* * * * *